(12) United States Patent
Tamai et al.

(10) Patent No.: US 10,030,555 B2
(45) Date of Patent: Jul. 24, 2018

(54) HONEYCOMB STRUCTURE BODY

(71) Applicant: DENSO CORPORATION, Kariya, Aichi-pref. (JP)

(72) Inventors: Koji Tamai, Nagoya (JP); Masahiro Oonishi, Yokohama (JP)

(73) Assignee: DENSO CORPORATION, Kariya (JP)

( * ) Notice: Subject to any disclaimer, the term of this patent is extended or adjusted under 35 U.S.C. 154(b) by 479 days.

(21) Appl. No.: 14/669,806

(22) Filed: Mar. 26, 2015

(65) Prior Publication Data

US 2015/0275726 A1 Oct. 1, 2015

(30) Foreign Application Priority Data

Mar. 26, 2014 (JP) .................................. 2014-063095
Dec. 2, 2014 (JP) .................................. 2014-243691

(51) Int. Cl.
*B01D 46/24* (2006.01)
*F01N 3/035* (2006.01)
*B01J 35/04* (2006.01)

(52) U.S. Cl.
CPC ........... *F01N 3/035* (2013.01); *B01D 46/247* (2013.01); *B01D 46/2451* (2013.01); *B01D 46/2462* (2013.01); *B01D 46/2474* (2013.01); *B01J 35/04* (2013.01); *B01D 2046/2488* (2013.01); *B01D 2046/2492* (2013.01); *Y10T 428/24149* (2015.01)

(58) Field of Classification Search
None
See application file for complete search history.

(56) References Cited

U.S. PATENT DOCUMENTS

| 5,514,446 | A | 5/1996 | Machida et al. |
| 6,248,421 | B1 | 6/2001 | Koike et al. |
| 9,073,289 | B2 * | 7/2015 | Tamai ...................... B32B 3/12 |
| 2004/0161583 | A1 | 8/2004 | Brew et al. |
| 2004/0266619 | A1 * | 12/2004 | Bernas ................ B29C 47/0028 |
| | | | 428/116 |
| 2005/0191461 | A1 | 9/2005 | Kasai et al. |

(Continued)

FOREIGN PATENT DOCUMENTS

| JP | 54-110189 | 8/1979 |
| JP | 7-246341 | 9/1995 |

(Continued)

*Primary Examiner* — David Sample
*Assistant Examiner* — Nicholas W. Jordan
(74) *Attorney, Agent, or Firm* — Nixon & Vanderhye P.C.

(57) ABSTRACT

A honeycomb structure body has a cylindrical outer peripheral wall, partition walls and cells. The cells are surrounded by the partition walls. In a radial cross section of the honeycomb structure body, the cells is divided into cell density sections having different cell densities formed from a central section to the outer peripheral wall. A boundary wall is formed between two cell density sections. Each cell density section has boundary cells and interior cells. The boundary cells are in contact with the boundary wall. The interior cells are not in contact with the boundary wall. In the radial cross section of the honeycomb structure body, an inscribed circle of each of the boundary cells has a diameter of not less than 0.5 mm. Further, an inscribed circle of an interior cell adjacent to the boundary cell also has a diameter of not less than 0.5 mm.

13 Claims, 14 Drawing Sheets

(56) References Cited

U.S. PATENT DOCUMENTS

| | | |
|---|---|---|
| 2011/0162348 A1 | 7/2011 | Kim et al. |
| 2014/0205794 A1 | 7/2014 | Tamai et al. |
| 2014/0287192 A1 | 9/2014 | Murata |
| 2015/0004353 A1 | 1/2015 | Hayashi et al. |

FOREIGN PATENT DOCUMENTS

| | | |
|---|---|---|
| JP | 11-268018 | 10/1999 |
| JP | 2008-018370 | 1/2008 |
| JP | 2013-173133 | 9/2013 |
| JP | 2014-136211 | 7/2014 |
| JP | 2014-184371 | 10/2014 |

* cited by examiner

HONEYCOMB STRUCTURE BODY

CROSS-REFERENCE TO RELATED APPLICATION

This application is related to and claims priority from Japanese Patent Applications No. 2014-63095 filed on Mar. 26, 2014, and No. 2014-243691 filed on Dec. 2, 2014 the contents of which are hereby incorporated by reference.

BACKGROUND OF THE INVENTION

1. Field of the Invention

The present invention relates to honeycomb structure bodies having a structure in which the honeycomb structure body has partition walls to form a plurality of cells, and a radial cross section of the honeycomb structure body, perpendicular to an axial direction along which the cells are formed, is divided into a plurality of cell density sections having different cell densities, and the cells belong to respective cell density sections.

2. Description of the Related Art

There have been known and widely used honeycomb structure bodies as a catalyst supporter, in which catalyst is supported. A honeycomb structure body is mounted to an exhaust gas pipe connected to an internal combustion engine such as a diesel engine and purifies exhaust gas emitted from the internal combustion engine. For example, such a honeycomb structure body has an outer peripheral wall of a cylindrical shape, and partition walls arranged in a lattice shape in the inside of the outer peripheral wall. In particular, the partition walls are formed and arranged in a lattice shape to form a plurality of cells along an axial direction of the honeycomb structure body. Each of the cells is surrounded by the partition walls. The cells are formed along an axial direction of the honeycomb structure body.

The honeycomb structure body having such a structure is mounted to the exhaust gas pipe connected to an internal combustion engine. Through the exhaust gas pipe, exhaust gas emitted from the internal combustion engine is discharged outside. Because exhaust gas has a high temperature, the catalyst supported in the honeycomb structure body is activated by heat energy of the exhaust gas and the activated honeycomb structure body at a high temperature purifies the exhaust gas when the exhaust gas is passing through the inside of the cells in the honeycomb structure body.

The recent vehicle emission control is becoming stricter year by year in view of environmental protection, and there is also strong demand to decrease carbon dioxide contained in exhaust gas emitted from internal combustion engines such as diesel engines and more improve fuel efficiency of motor vehicles. It is very important to eliminate particulate matter such as black smoke contained in exhaust gas emitted from diesel engines in view of recent vehicle emissions control which intends to reduce motor vehicle emissions, etc. In order to solve and satisfy the above recent requirement, many motor vehicles are equipped with a diesel particulate filter. The diesel particulate filter equipped with a honeycomb structure body is mounted on an exhaust gas pipe through which exhaust gas emitted from a diesel engine is discharged to the outside of the motor vehicle. The diesel particulate filter purifies such exhaust gas. For this reason, this increases an amount of the noble metal used as catalyst in the honeycomb structure body. In order to avoid price risk of the noble metal and resource procurement risk, it is required to reduce a total amount of the noble metal used in the honeycomb structure body. Accordingly, there is a strong demand for a honeycomb structure body to have an excellent purification capability of exhaust gas.

For example, a patent document, Japanese patent laid open publication No. 2013-173133 has disclosed a honeycomb structure body having a conventional structure in which a plurality of cell density sections having different cell densities is formed in a radial direction of the honeycomb structure body. This radial direction is perpendicular to an axial direction of the honeycomb structure body. The cell density sections are formed from a central section to the outer peripheral section in a radial cross section. Because the outer peripheral section has a low flowing speed of exhaust gas as compared with a flowing speed of the exhaust gas in the central section, a cell density is gradually reduced from the central section to the outer peripheral section in the honeycomb structure body disclosed in the patent document, Japanese patent laid open publication No. 2013-173133. This structure makes it possible to have a uniform flowing speed of exhaust gas in the honeycomb structure body, and promote an effective use of catalyst supported in the honeycomb structure body. The honeycomb structure body having the structure previously described improves the exhaust gas purification capability.

Still further, a boundary section is further formed between the cell density sections having different cell densities in the honeycomb structure body disclosed in the patent document, Japanese patent laid open publication No. 2013-173133. Because the boundary section has boundary cells having a specific structure, it is possible to reduce a pressure loss of the honeycomb structure body and increase the exhaust gas purification capability.

However, the boundary section formed between the adjacent cell density sections having different cell densities in the honeycomb structure body previously described has an insufficient strength around the boundary section, and there is a possible drawback of the honeycomb structure body easily breaking due to external stress. Furthermore, the honeycomb structure body is generally produced by firing a honeycomb mold body having a honeycomb structure. The boundary section formed between the cell density sections in the honeycomb structure body non-uniformly shrinks during a drying step and a firing step in the manufacturing process of producing honeycomb structure bodies. For this reason, it is difficult to produce a honeycomb structure body having a correct roundness. This reduces a productivity of honeycomb structure bodies having a correct roundness.

That is, it is possible to increase the strength of the honeycomb structure body when a boundary wall section is formed between two cell density sections having different cell densities, and reduce influence of outside stress applied to the honeycomb structure body. However, because small sized cells having a small cross section are formed near the boundary wall section, catalyst clogging (in which a cell is clogged with catalyst) occurs in the small sized cells when catalyst is supported in the honeycomb structure body during the manufacturing process of producing honeycomb structure bodies. As a result, such small sized cells having a small cross section formed adjacent to the boundary wall section are clogged with catalyst. This increases a pressure loss of the honeycomb structure body. In addition, the formation of catalyst-clogged cells causes a reduction in exhaust gas flow in some sections which support catalyst and are clogged by catalyst. This is a waste of catalyst because catalyst is used in the unnecessary sections in the honeycomb structure body.

SUMMARY

It is therefore desired to provide a honeycomb structure body having a structure of an excellent strength capable of preventing occurrence of catalyst clogging in cells and reducing a pressure loss of the honeycomb structure body.

An exemplary embodiment of the present invention provides a honeycomb structure body having an improved structure comprised of an outer peripheral wall, partition walls, and a plurality of cells. The outer peripheral wall has a cylindrical shape. The partition walls are formed in the inside of the outer peripheral wall and arranged in a lattice shape. Each of the cells is surrounded by the partition walls. In a cross section in a radial direction of the honeycomb structure body, which is perpendicular to an axial direction of the honeycomb structure body, the cells are divided into a plurality of cell density sections arranged from a central section to the outer peripheral wall. In particular, the cell density sections have different cell densities. A boundary wall is formed between two cell density sections which are adjacent to each other. Each of the cell density sections is comprised of boundary cells and interior cells. The boundary cells are in contact with the boundary wall. The interior cells are not in contact with the boundary wall and surrounded by the partition walls. In the cross section along the radial direction (i.e. in a radial cross section), which is perpendicular to the axial direction of the honeycomb structure body, an inscribed circle of each of the boundary cells has a diameter of not less than 0.5 mm.

The honeycomb structure body according to the present invention has a plurality of the cell density sections formed in a radial direction which is perpendicular to an axial direction of the honeycomb structure body. That is, the cell density sections are formed in a radial cross section and arranged from the central point to the outer peripheral wall. For example, the honeycomb structure body has two cell density sections, a first cell density section and a second cell density section having different cell densities. The boundary wall is formed between the first cell density section and the second cell density section. This structure makes it possible to have a uniform gas flow distribution of exhaust gas in a radial cross section of the honeycomb structure body. Such exhaust gas is emitted from an internal combustion engine to outside through the honeycomb structure body. The exhaust gas is introduced into the inside of the honeycomb structure body and is flowing through the cells of the honeycomb structure body at a uniform flow distribution of exhaust gas. Further, the honeycomb structure body of a cylindrical shape has the boundary wall which is formed between the first cell density section and the second cell density section. This structure increases the mechanical strength of the honeycomb structure body. It is therefore possible to prevent generation of defects in the honeycomb structure body and avoid the honeycomb structure body from being broken during a manufacturing process or when the products of the honeycomb structure body are conveyed. Still further, this structure makes it possible to prevent deterioration of the roundness of a honeycomb mold body during the manufacturing process. This provides an excellent productivity of the honeycomb structure body.

Further, each of the cell density sections has the boundary cells and the interior cells. The boundary cells are in contact with the boundary wall. The interior cells are not in contact with the boundary wall and are surrounded by the partition walls. In a radial cross section of the honeycomb structure body, an inscribed circle of each of the boundary cells has a diameter of not less than 0.5 mm. This structure increases a size of the boundary cell and prevents occurrence of catalyst clogging in the boundary cells when catalyst is supported by the boundary cells and the interior cells of the honeycomb structure body during the manufacturing process. Further, this structure makes it possible to decrease a pressure loss because of avoiding occurrence of catalyst clogging.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
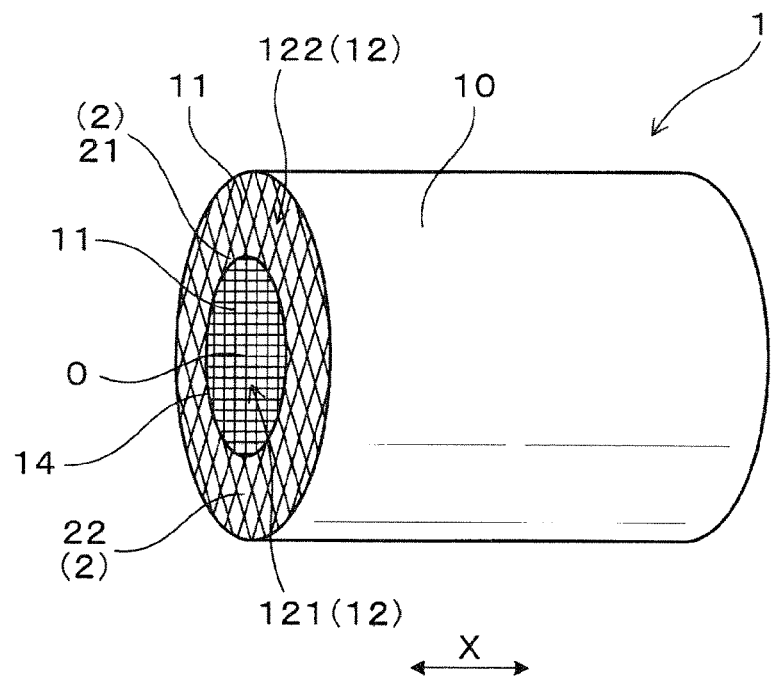
FIG. 1 is a perspective view showing an overall structure of a honeycomb structure body according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

A description will be given of a honeycomb structure body according to the present invention.

A honeycomb structure body according to an exemplary embodiment of the present invention has a plurality of cell density sections having different cell densities arranged in a radial direction from a central section to an outer peripheral wall. That is, the honeycomb structure body is divided into a plurality of the cell density sections having different cell densities in a radial direction from the central section to the outer peripheral wall. The cells are arranged in a same cell density in each of the cell density sections. Further, the two cell density sections which are arranged adjacent to each other have different cell densities. The cell density is changed stepwise in a radial direction.

There are methods of changing stepwise a cell density of the cell density sections formed in a radial direction from the central section to the outer peripheral wall in the honeycomb structure body. For example, one method changes a cell pitch between adjacent cells, and another method changes a shape of the cells. The cells have a polygonal, for example, a triangle shape, a rectangular shape, a pentagonal shape, a hexagonal shape, etc. It is preferable for each cell formed in the honeycomb structure body to have a rectangular shape from the point of view of mechanical strength.

When the cells are formed in a polygonal shape on a cross section in a radial direction (or on a radial cross section) of the honeycomb structure body, it is preferable that a corner section, at which two polygonal shaped cells are arranged adjacently to each other, has a rounded shape, and a radial of curvature of the corner section is not less than 0.03 mm. This structure makes it possible to more increase mechanical strength of the honeycomb structure body. In addition, it is therefore possible to improve reliability of the honeycomb structure body as commercial products. From the same point of view, it is preferable for a corner section of the cell to have a radius of curvature of not less than 0.05 mm, and more preferable to have a radius of curvature of not less than 0.1 mm, and most preferable to have a radius of curvature of not less than 0.15 mm.

An inscribed circle of a boundary cell is a virtual circle which is in contact with at least three partition walls (three sides) of the boundary cell, i.e. which form the boundary cell. When not less than two inscribed circles are present in the boundary cell, the inscribed circle having a maximum diameter is determined as the inscribed circle of the boundary cell. In the structure of the honeycomb structure body according to the present invention, the inscribed circle of each of the boundary cells has a diameter of not less than 0.5 mm. In the structure of the honeycomb structure body according to the present invention, it is sufficient for a minimum diameter of the inscribed circle of the boundary cell to be not less than 0.5 mm. There is a concrete method of producing the honeycomb structure body having the structure previously described in which the diameter of the inscribed circle of the boundary cell is not less than the predetermined value, i.e. not less than 0.5 mm. For example, as will be explained later in detail, a common use partition wall arranged between the boundary cell and an interior cell which is adjacent to the boundary cell is moved, i.e. relocated toward a predetermined direction, or such an interior cell is eliminated.

It is possible to adjust a diameter of an inscribed circle of each of usual interior cells, excepting the boundary cells and adjacent interior cells which are arranged next to the boundary cells, to be within a range of 0.5 mm to 1.6 mm. When considered from the viewpoint of reducing a pressure loss and increasing mechanical strength of a honeycomb structure body, it is preferable for an inscribed circle of each usual interior cell to have a diameter within a range of 0.9 mm to 1.6 mm. A diameter of the inscribed circle of each of the usual interior cells and the boundary cells is defined by the same manner previously described.

A cell density of the cells arranged in the honeycomb structure body is defined by the number of cells per unit area. Specifically, when the unit cell area is defined as an area surrounded by intermediate lines (for example, such intermediate lines are virtual lines. A rectangular shaped cell is surrounded by four partition walls, the intermediate line runs through a central point in a thickness direction of each partition wall. The unit cell area is an area surrounded by the four intermediate lines when the cell is a rectangular shape), it is possible to obtain the number of cells per unit area by using the calculated unit cell area. The obtained number indicates the cell density. In particular, such a calculation of the cell density uses the usual interior cells, does not use any boundary cells, adjacent interior cells and adjacent exterior cells. That is, the boundary cells are in contact with the boundary wall having a cylindrical shape formed between two cell density sections having different cell densities, which are adjacent to each other through the boundary wall. Each of the adjacent interior cells has partition walls which are shifted in position as compared with the partition walls of the usual interior cells. The adjacent exterior cells are in contact with the outer peripheral wall having a cylindrical shape.

As previously described, the cell density is calculated on the basis of the cells having a circular shaped cross section in a radial direction and the cells having a rectangular shaped cross section in a radial direction.

It is possible that the honeycomb structure body according to the present invention have a monolithic structure. In addition, it is also possible that the honeycomb structure body is made of a plurality of segments assembled together. It is preferable for the honeycomb structure body to have a monolithic structure. This can eliminate connection sections when the segments are assembled together in the latter case, and further reduce a whole pressure loss of the honeycomb structure body in addition to a pressure loss obtained by the improved structure of the honeycomb structure body according to the present invention.

The honeycomb structure body according to the present invention is made of ceramic raw material, for example, cordierite, SiC, aluminum titanate, etc.

For example, the honeycomb structure body according to the present invention is used as a catalyst converter, etc. The catalyst converter is capable of purifying exhaust gas emitted from an internal combustion engine. Catalyst is supported on the partition walls of the cells in the honeycomb structure body. For example, the honeycomb structure body according to the present invention has a porosity within a range of 10% to 70%. The honeycomb structure body according to the present invention has an average pore size of not less than 2 μm, for example. Further, the honeycomb structure body according to the present invention has the partition walls having a thickness within a range of 40 μm to 160 μm. Still further, the honeycomb structure body according to the present invention has the boundary wall having a thickness within a range of 0.04 mm to 0.4 mm.

It is acceptable that a central point of the outer peripheral wall having a cylindrical shape is conformed to or differs from a central point of the boundary wall having a cylindrical shape. That is, it is acceptable that a central point of a cell density section formed in the interior of the boundary wall differs from a central point of a radial cross section in the honeycomb structure body according to the present invention.

First Exemplary Embodiment

A description will be given of various test samples according to exemplary embodiment of the honeycomb structure body and comparative examples.

The first exemplary embodiment prepared test samples E1 to E6 as the honeycomb structure body according to the first exemplary embodiment and comparative examples C1 to C5, and evaluated these samples.

A description will now be given of the test samples E1 to E6 according to the first exemplary embodiment.

Figure 2:
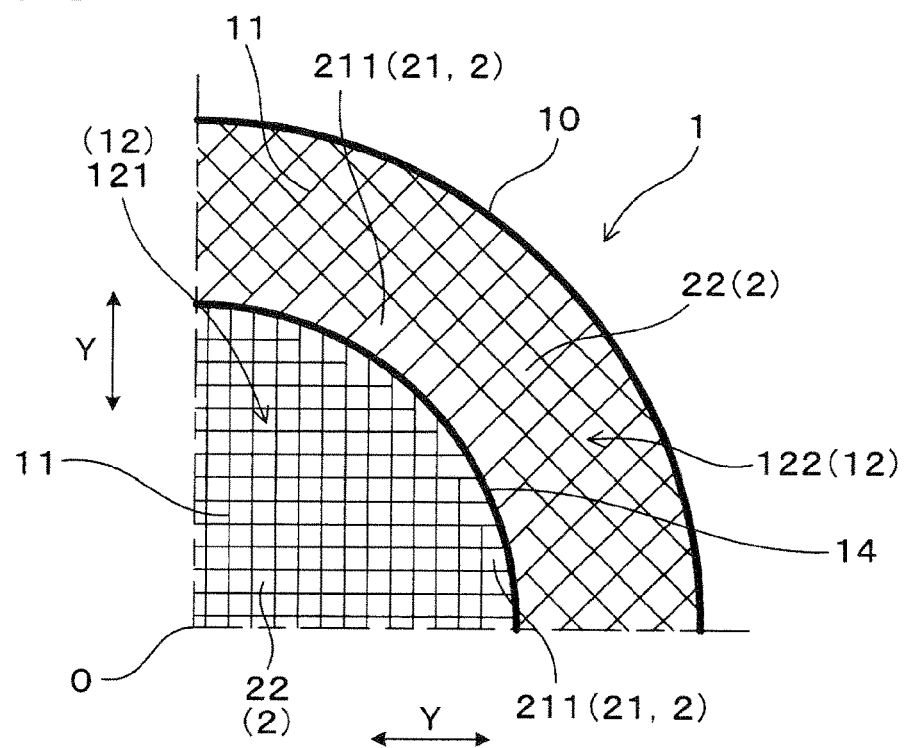
FIG. 2 is a view showing a partial cross section in a radial direction of the honeycomb structure body (test samples E1 to E6) according to the first exemplary embodiment shown in FIG. 1.

FIG. 1 is a perspective view showing an overall honeycomb structure body 1 according to the first exemplary embodiment. FIG. 2 is a view showing a partial cross section in a radial direction of the honeycomb structure body (test samples E1 to E6) according to the first exemplary embodiment shown in FIG. 1.

As shown in FIG. 1 and FIG. 2, the honeycomb structure body 1 is made of ceramics and has an outer peripheral wall 10 having a cylindrical shape, partition walls 11 arranged in a lattice shape in the interior section of the outer peripheral wall 10 and a plurality of cells 2. Each of the cells 3 is surrounded by the partition walls 11. In a cross section in a radial direction (i.e., in a radial cross section) which is perpendicular to an axial direction X of the honeycomb structure body 1, a plurality of cell density sections 12 is formed. That is, the cell density sections 12 have different cell densities and are formed in a radial direction Y from a central section O to the outer peripheral wall 10. A boundary wall 14 is formed between the cell density sections 12 (a first ell density section and a second cell density section) which are adjacent to each other through the boundary wall 14. The cells 2 are composed of boundary cells 21 and interior cells 22 (or usual interior cells). Each of the boundary cells is in contact with the boundary wall 14. None of the interior cells 22 are in contact with the boundary wall 14, and they are surrounded by the partition walls 11.

Figure 3:
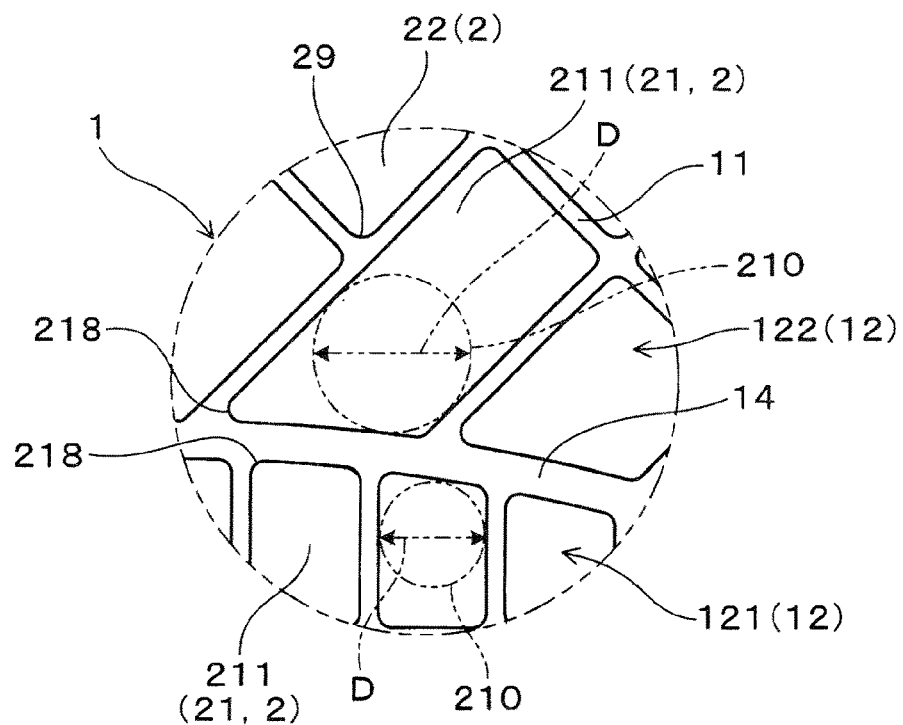
FIG. 3 is a view showing an enlarged partial cross section in a radial direction of the honeycomb structure body (test samples E1 to E6) according to the first exemplary embodiment shown in FIG. 1.

FIG. 3 is a view showing an enlarged partial cross section in a radial direction of the honeycomb structure body 1 (test samples E1 to E6) according to the first exemplary embodiment shown in FIG. 1.

As shown in FIG. 2 and FIG. 3, in a cross section in the axial direction X of the honeycomb structure body 1, the boundary cell 21 has an inscribed circle 210 having a diameter D of not less than 0.5 mm.

In the structure of the honeycomb structure body 1 according to the first exemplary embodiment, at least one of the boundary cells 21 is formed by connection cells 211. Each of the connection cells 211 is formed by connecting two cells 2 which are arranged adjacent to each other.

A description will now be given of the honeycomb structure body 1 according to the first exemplary embodiment in detail.

The honeycomb structure body 1 according to the first exemplary embodiment is used as a catalyst carrier capable of supporting catalyst. The catalyst carrier purifies exhaust gas emitted from internal combustion engines such as diesel engines.

As shown in FIG. 1 and FIG. 2, the honeycomb structure body 1 has a plurality of the partition walls 11, a plurality of the cells 2, and the outer peripheral wall 10 having a cylindrical shape. The partition walls 11 are arranged in a rectangular lattice shape. Each of the cells 2 is surrounded by the partition walls 11. The outer peripheral wall 10 has a cylindrical shape and surrounds the outer peripheral surface of the honeycomb structure body 1.

A radial cross section of each of the cells 2 has a rectangular shape including a square shape. Each of the cells 2 is formed to extend along the axial direction X of the honeycomb structure body 1. The honeycomb structure body 1 is made of cordierite and has a monolithic structure. The honeycomb structure body 1 has a diameter of 103 mm and a total length of 105 mm, for example.

As shown in FIG. 2, two cell density sections 12, i.e. a first cell density section 121 and a second cell density section 122, are formed in a radial cross section Y which is perpendicular to the axial direction X of the honeycomb structure body 1. The first cell density section 121 and the second cell density section 122 have different cell densities. The cells in each of the first cell density section 121 and the second cell density section 122 are formed with a same cell density. In particular, the cells arranged in the second cell density section 122 have a second cell density which is lower than a first cell density of the cells arranged in the first cell density section 121. Table 1 shows the cell density of each of the first cell density section 121 and the cell density of the second cell density section 122 in each of the samples. Table 1 will be described later in detail.

FIG. 2, FIG. 5, FIG. 7, FIG. 8, FIG. 10, FIG. 11, FIG. 12, FIG. 14, FIG. 16, FIG. 20, FIG. 22, FIG. 24, and FIG. 26 shows a partial cross section, i.e. a quarter cross section in a radial direction of various samples as a honeycomb structure body.

As shown in FIG. 2, the first cell density section 121 contains the central point O of the honeycomb structure body 1 and is arranged in the innermost area of the honeycomb structure body 1. On the other hand, the second cell density section 122 is arranged in the outermost section which contains the outer peripheral wall 10 of the honeycomb structure body 1. That is, the second cell density section 122 is arranged in the outermost section of the cell density section 12. Each of the partition walls 11 in the first cell density section 121 and the second cell density section 122 has a thickness of 0.09 mm (90 μm).

As shown in FIG. 1 and FIG. 2, the honeycomb structure body 1 has the boundary wall 14 by which the honeycomb structure body 1 is divided into the first cell density section 121 and the second cell density section 122 in a radial cross section in a radial direction Y which is perpendicular to the axial direction X. The boundary wall 14 has a cylindrical shape. In the structure of the honeycomb structure body 1 according to the first exemplary embodiment, the boundary wall 14 has a thickness of 0.2 mm.

The boundary cells 21 are in contact with the boundary wall 14. Each of the boundary cells 21 is surrounded by the partition walls 11 and the boundary wall 14. On the other hand, each of the usual interior cells 2 (interior cells 22) has a predetermined shape (for example, as a rectangle shape in the first exemplary embodiment) and is surrounded by the partition walls 11 only. In other words, as shown in FIG. 3, the usual interior cell 2 (or interior cell 22) is different in shape from the boundary cell 21.

As shown in FIG. 2 and FIG. 3, each of the boundary cells 21 in each of the first cell density section 121 and the second cell density section 122 is formed by a connection cell 211. The connection cell 211 is formed by combining at least two cells 2 which are arranged adjacently to each other. Because the boundary cell 21 is formed by the connection cell 211, the boundary cell 21 has an inscribed circle 210 having a diameter D of not less than 0.5 mm.

A description will now be given of the structure of the connection cell 211 with reference to FIG. 4.

Figure 4:
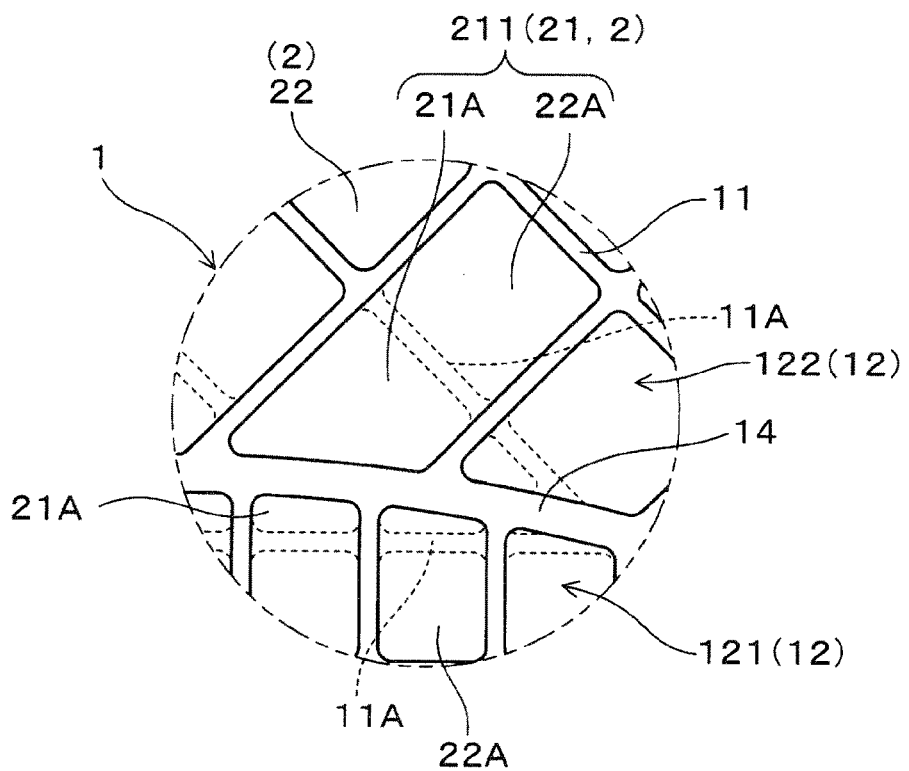
FIG. 4 is a view showing an enlarged partial cross section in a radial direction of the honeycomb structure body (test samples E1 to E6) having virtual partition walls according to the first exemplary embodiment shown in FIG. 1.

FIG. 4 is a view showing an enlarged partial cross section in a radial direction of the honeycomb structure body (test samples E1 to E6) according to the first exemplary embodiment shown in FIG. 1 in which a virtual partition wall is considered in a boundary cell 21 as a connection cell 211.

As previously described, the connection cell 211 is comprised of not less than two cells connected together. A virtual partition wall 11A can be considered (which is designated by the dotted lines shown in FIG. 4). The virtual partition wall 11A is present before two cells are combined to form the connection cell 211 as the boundary cell 21. This virtual partition wall 11A is a partition wall present between two cells before the two cells of a predetermined shape are combined in each of the cell density sections 121 and 122. As shown in FIG. 4, when the virtual partition wall 11A is present, a virtual interior cell 22A (a perfect cell) having a rectangle shape surrounded by the virtual partition wall 11A and other partition walls 11 and a virtual boundary cell 21A (an imperfect cell) surrounded by the boundary wall 14, the virtual partition wall 11A and another partition wall 11. The imperfect cell 21A has a cross sectional area which is smaller in radial cross section than a cross sectional area of the perfect cell 22 (22A). That is, the formation of such boundary cells having a small size reduces the entire mechanical strength of the honeycomb structure body.

As shown in FIG. 4, the connection cell 211 is formed by combining the two cells, i.e. the imperfect cell 21A and the perfect cell 22A, in which the virtual partition wall 11A has been eliminated. In a concrete example, the connection cells 211 are formed by using a metal die having slit grooves to be used for forming the connection cells 211 during the production of the honeycomb structure body 1. In more detail, a metal die is used, in which no slit grove is formed to make a virtual partition wall 11A which is virtually present between the virtual partition wall (imperfect cell) 21A and a virtual interior cell (perfect cell) 22A. It is thereby possible to produce the honeycomb structure body 1 having the boundary cells 21 and the connection cells 211 by using the metal die having the structure previously described.

The explanation previously disclosed shows the connection cell having the structure in which the imperfect cell 21A and the perfect cell 22A are arranged adjacently and connected together. However, the concept of the present invention is not limited by this. It is acceptable to connect the imperfect cell 21A with another imperfect cell, or another perfect cell, or both an imperfect cell and a perfect cell. Further, FIG. 3 clearly shows the structure of the honeycomb structure body 1 as an actual honeycomb structure body 3 not having any virtual imperfect cell 21A and virtual perfect cell 22A, i.e. from which the virtual imperfect cell 21A and the virtual perfect cell 22A have been eliminated.

Figure 5:
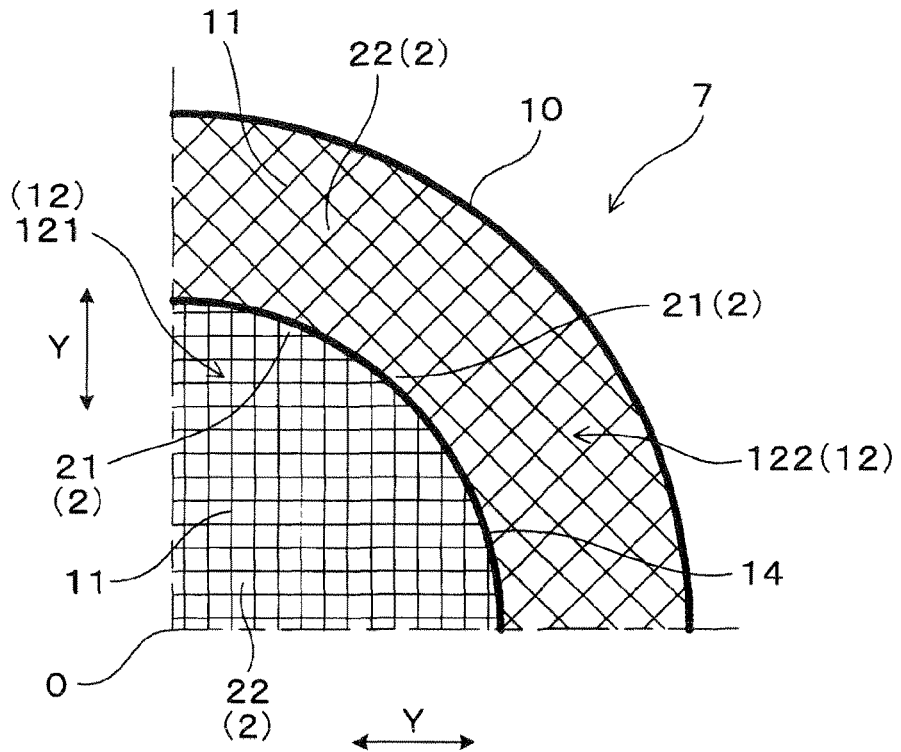
FIG. 5 is a view showing a partial cross section in a radial direction of a honeycomb structure body (comparative sample C1)
Figure 6:
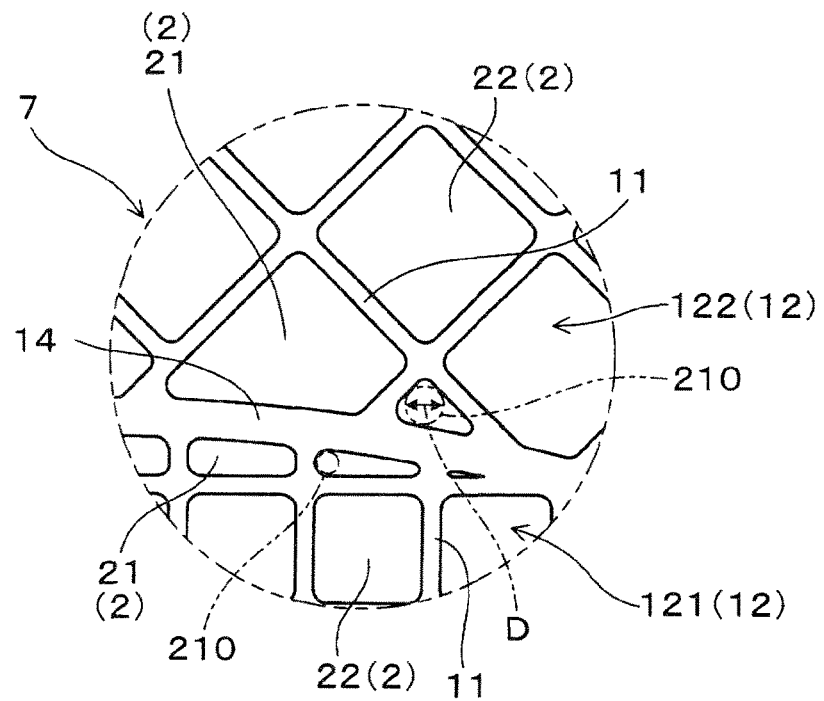
FIG. 6 is a view showing a enlarged partial cross section in a radial direction of the honeycomb structure body (comparative sample C1) shown in FIG. 5.

FIG. 5 is a view showing a partial cross section in a radial direction of a honeycomb structure body 7 as a comparative samples C1 used in the first exemplary embodiment. FIG. 6 is a view showing an enlarged partial cross section in a radial direction of the honeycomb structure body 7 shown in FIG. 5. As shown in FIG. 5 and FIG. 6, the honeycomb structure body 7 as the comparative example C1 has imperfect cells as boundary cells 21 without any connection cell.

The first exemplary embodiment produced the test samples E1 to E6 and the comparative examples C4 and C5 having a different cell connection pattern. The test samples E1 to E6 and the comparative examples C4 and C5 have the boundary cells 21 having a different size. The boundary cell 21 in each of the test samples E1 to E6 is the connection cell 211.

As shown in FIG. 3, it is possible to calculate the size of the boundary cell 21 on the basis of the diameter D of the inscribed circle 210 of the boundary cell 21 in a radial cross section of each of the test samples E1 to E6, and the comparative examples C4 and C5. In particular, the inscribed circle 210 of the boundary cell 21 has a maximum diameter in contact with at least three sides of the boundary cell 21.

Table 1 shows the minimum diameter D of the inscribed circle in the entire inscribed circles of the boundary cells 21 in each of the test samples E1 to E6 and the comparative samples C4 and C5.

Further, as shown in FIG. 3, the honeycomb structure body 1 according to the first exemplary embodiment (test samples E1 to E6 and the comparative examples C4 and C5) has the boundary cells 21. Each of the boundary cells 21 has a round corner section 218 which is adjacent to the boundary wall 14. That is, the round corner section 210 in the boundary cell 21 is formed by the boundary wall 14 and the partition wall 11. The round corner section 218 has a round shape. The first exemplary embodiment produced a plurality of the honeycomb structure bodies 1 (test samples E1 to E6 and the comparative samples C4 and C5), each of which has the corner section 218 having a different radius of curvature. Table 1 shows the radius of curvature of the corner section 218 in each of the test samples E1 to E6 and the comparative samples C4 and C5. As previously described, the honeycomb structure body 1 according to the first exemplary embodiment (test samples E1 to E6, and comparative examples C4 and C5) has the interior cells 22 (perfect cells), a radial cross section of which has a rectangle shape. The corner section 29 of each of the cells 2 containing those interior cells 22 has a round shape. The corner sections 29 of the cells 2, excepting the corner sections 218 of the boundary cells 21 arranged adjacently the boundary wall 14, has a radius of curvature of 0.03 mm.

A description will now be given of the honeycomb structure body 7 (comparative examples C1, C2 and C3).

As shown in FIG. 5 and FIG. 6, the test sample C1 is a honeycomb structure body 7 which does not have any connection cell to be used as the boundary cell 21. That is, because the test sample C1 does not have any connection cell, each of the boundary cells 21 adjacent to the boundary wall 14 in the test sample C1 is comprised of an imperfect cell. Each of the boundary cells 21 has an imperfect shape, and a cross sectional area of which in a radial direction is smaller than a cross sectional area of the interior cell (as a perfect cell) 22. As shown in FIG. 6, the comparative sample C1 has the cells, each of which has an inscribed circle having a diameter D of less than 0.5 mm. Other components of the comparative sample C1 are the same as those of the test samples E1 to E6.

Figure 7:
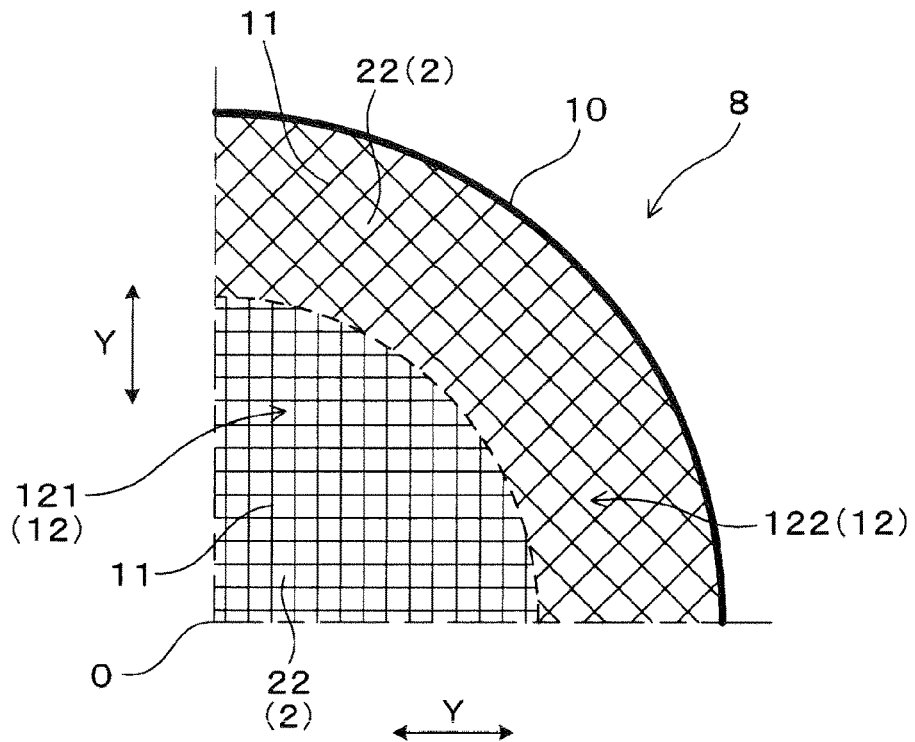
FIG. 7 is a view showing a partial cross section in a radial direction of a honeycomb structure body (comparative sample C2)

FIG. 7 is a view showing a partial cross section in a radial direction of a honeycomb structure body 8 (comparative sample C2) used in the first exemplary embodiment.

As shown in FIG. 7, the comparative sample C2 does not have any boundary wall or any connection cell. That is, the honeycomb structure body 8 as the comparative sample C2 does not have any boundary wall formed between the first cell density section 121 and the second cell density section 122 in each of the test samples E1 to E6. Further, the honeycomb structure body 8 as the comparative sample C2 does not have any connection cell which is formed by combining at least two cells arranged adjacently to each other. Other components of the comparative sample C2 are the same as those of each of the test samples E1 to E6.

Figure 8:
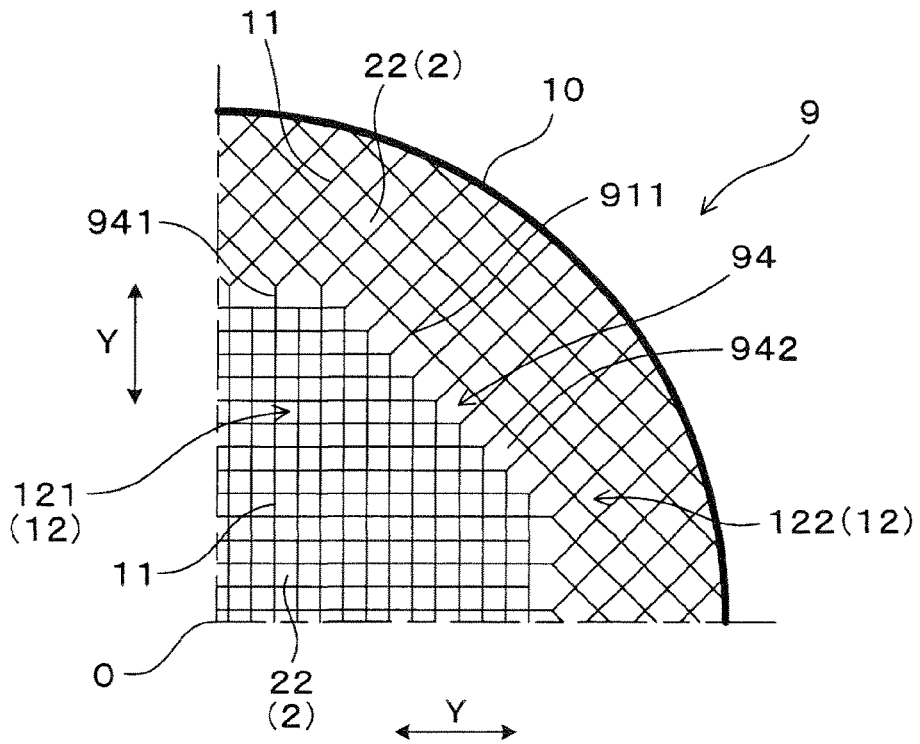
FIG. 8 is a view showing a partial cross section in a radial direction of a honeycomb structure body (comparative sample C3)

FIG. 8 is a view showing a partial cross section in a radial direction of a honeycomb structure body 9 (comparative sample C3) used in the first exemplary embodiment.

As shown in FIG. 8, the honeycomb structure body 9 has a boundary section 94 instead of having the connection cells and the boundary wall. The boundary section 94 has a conventional structure, for example, disclosed in Japanese patent laid open publication No. 2013-173133.

Specifically, as shown in FIG. 8, the honeycomb structure body 9 has the boundary section 94 formed between the first cell density section 121 and the second cell density section 122. The boundary section 94 has a plurality of boundary cells 942 having a polygonal shape, which is different in shape from the cells 2 (or the interior cells 22) formed in the first and second cell density sections 121 and 122. Each of the boundary cells 942 is surrounded by boundary partition walls 941, each of which connects the partition wall 11 of the first cell density section 121 with the partition walls 11 of the second cell density section 122. Further, each of boundary cells in at least some of the boundary cell 942 is surrounded by other boundary walls 941.

The honeycomb structure body 9 as the comparative sample C3 has a structure which satisfies a relationship of $\varphi 1/\varphi 2 >= 1.25$, where $\varphi 1$ indicates an average hydraulic diameter of the boundary cells 942 formed in the boundary section 94, and $\varphi 2$ indicates an average hydraulic diameter of the cells 2 formed in the first cell density section 121 formed directly inside of the boundary section 94.

The boundary section 94 formed in the honeycomb structure body 9 has an octagonal shape in a radial cross section of the honeycomb structure body 9. The boundary section 94 has the boundary partition walls 941 and the boundary cells 942. The boundary section 94 connects the partition wall 11 formed in the cell density section 12 (as the first cell density section 121) with the partition wall 11 formed in the cell density section 12 (as the second cell density section 122).

The boundary cells 942 are surrounded by the partition walls 11 in the cell density sections 12 such as the first cell density section 121 and the second cell density section 122 formed at both sides of the boundary walls 941 and the boundary section 94. In addition, the boundary cells 942 have a shape which is different from the shape of the cells 2 formed in the cell density sections 12 (as the first cell density section 121 and the second cell density section 122) formed at both sides of the boundary section 94.

The honeycomb structure body 9 has the boundary cells 942 having a pentagonal shape. The boundary walls 941 are formed to connect grid points 911 of the partition walls 11 arranged in a lattice shape of the cell density sections 12 (as the first cell density section 121 and the second cell density section 122) formed at both sides of the boundary section 94. Other components of the comparative sample C3 are the same as those of the test samples E1 to E6.

The same components between the comparative samples C1, C2 and C3 and the test samples E1 to E6 are designated by the same reference numbers and characters. The explanation of these same components is omitted for brevity.

A description will now be given of the method of producing the honeycomb structure bodies (test samples E1 to E6 and comparative samples C1 to C5).

The method of producing a honeycomb structure body prepares ceramic raw material composed of kaolin, fused silica, aluminum hydroxide, alumina, carbon particles, etc. so that cordierite as the ceramic raw material has a chemical composition of $SiO_2$ within a range of 45 to 55 weight %, $Al_2O_3$ within a range of 33 to 42 weight %, and MgO within a range of 12 to 18 weight %. The method adds water, binder, etc. having a predetermined amount to the prepared cordierite as raw material to make a mixture. The mixture is mixed to make the mixed ceramic raw material.

The method extrudes the mixed ceramic raw material by using an extrusion metal die to produce a honeycomb structure molded body. The extrusion metal die has a cross section having a pattern of slit grooves which correspond to a cell arrangement formed by the partition walls arranged in the honeycomb structure body.

The method dries the honeycomb structure molded body by using microwaves. The method cuts the dried honeycomb structure body to a plurality of parts having a desired length. After this, the method fires the honeycomb structure body having the desired length at a maximum temperature (for example, within a range of 1390° C. to 1430° C.). The production of the honeycomb structure body is thereby completed.

A description will now be given of evaluation results of the honeycomb structure bodies (test samples E1 to E6 and comparative examples C1 to C5) in occurrence of catalyst clogging in cells, pressure loss and isostatic strength.

In order to detect occurrence of catalyst clogging in each of the honeycomb structure bodies, it was detected whether or not cells were formed at a boundary section between cell density sections having different cell densities when catalyst was supported in each of the honeycomb structural bodies. The state of catalyst clogging indicates that opening end surface of each cell is completely clogged with catalyst.

It is possible to use catalyst composed of γ-alumina, oxygen storage material and at least one of platinum (Pt), Rhodium (Rh) and Palladium (Pd) as a three-way catalyst, There are ceria, etc. as the oxygen storage material.

After slurry containing catalyst was poured into the inside of the cells, the honeycomb structural body was fired to support the catalyst in the honeycomb structural body. The number of catalyst-clogged cells in each of the honeycomb structural bodies (test samples E1 to E6, comparative samples C1 to C3) was detected. When the number of catalyst-clogged cells becomes not less than 100, the evaluation result indicates "D". When within 20 to 99, the evaluation result indicates "C". Further, when within 1 to 19, the evaluation result indicates "B". When the number of catalyst-clogged cells is zero, the evaluation result indicates "A". Table 1 shows the evaluation result in occurrence of catalyst clogging of each of the test samples E1 to E6 and comparative samples C1 to C3.

The evaluation of isostatic strength, i.e. isostatic breaking strength of each of the test samples E1 to E6 and comparative samples C1 to C5 was performed on the basis of an isostatic breaking strength test defined by standard M505-87 of JASO (Japanese Automotive Standards Organization). Specifically, the sample as the honeycomb structural body was set in a cylinder casing made of rubber and sealed with a cover made of aluminum. The isostatic pressing of each sample was performed in water to detect a load when the honeycomb structural body as each sample was broken and to calculate the isostatic breaking strength on the basis of the detected load.

The isostatic breaking strength of each of the test samples E1 to E6 and the comparative samples C1 to C5 was detected by the method previously described. Table 1 shows a ratio of the detected isostatic breaking strength of each sample to the isostatic breaking strength of the comparative sample C1.

A pressure loss of each of the honeycomb structural bodies (test samples E1 to E6 and comparative samples C1 to C5) was detected by a pressure loss detection apparatus. The test samples E1 to E6 and the comparative samples C1 to C5 supported catalyst therein.

Figure 9:
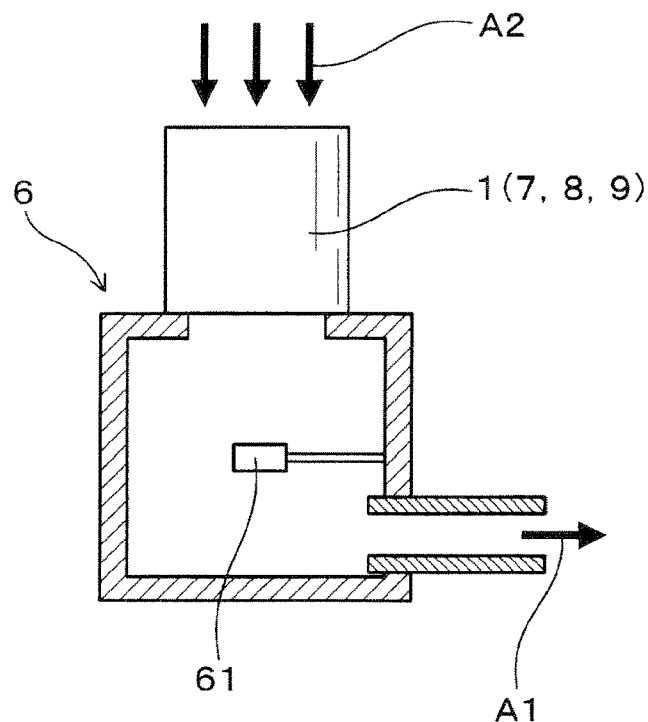
FIG. 9 is a view showing a pressure loss detection apparatus for detecting a pressure loss of each of the test samples and the comparative samples.

FIG. 9 is a view showing a pressure loss detection apparatus 6 for detecting a pressure loss of each of the test samples E1 to E6 and the comparative samples C1 to C3 used in the first exemplary embodiment.

Specifically, as shown in FIG. 9, each sample as the honeycomb structure body 1, 7, 8, 9 was mounted on the pressure loss detection apparatus 6. The pressure loss of each sample was detected when an air blower (not shown) was used, i.e. sucked air A1 in the pressure loss detection apparatus 6 in which each sample was arranged. This produces a negative pressure in the inside of the pressure loss detection apparatus 6, and a predetermined amount of introduced air A2 was introduced into the inside of the honeycomb structural body 1, 7, 8, 9 arranged in the pressure loss detection apparatus 6. It was adjusted that the introduced new air A2 had 6 $m^3$/minutes introduced in the inside of each sample. A pressure sensor 61 arranged in the inside of the pressure loss detection apparatus 6 detected a pressure of inside air. A difference between atmospheric pressure and the pressure of inside air detected by the pressure sensor 61 was calculated in order to obtain a pressure loss of each sample.

Table 1 shows a ratio of the detected pressure loss of each sample to the pressure loss of the comparative sample C1.

That is, Table 1 shows the detected parameters of each of the test samples E1 to E6 and the comparative samples C1 to C5:

(a1) Cell density ($\times 10^4$ cells/$m^2$) of first cell density section;
(a2) Cell density ($\times 10^4$ cells/$m^2$) of second cell density section;
(a3) Presence of boundary cell;
(a4) Presence of connection cell
(a5) Minimum diameter D (mm) of inscribed circle in boundary cell (formed by connection cell);
(a6) Radius of curvature (mm) of corner section of boundary cell arranged adjacent to boundary wall;
(a7) Evaluation result in catalyst clogging in cell;
(a8) Isostatic strength ratio; and
(a9) Pressure loss ratio.

TABLE 1

| Sample No. | C1 | C2 | C3 | C4 | C5 | E1 | E2 | E3 | E4 | E5 | E6 |
|---|---|---|---|---|---|---|---|---|---|---|---|
| Cell density ($\times 10^4$ cells/m$^2$) of First cell density section | 93 | 93 | 93 | 93 | 93 | 93 | 93 | 93 | 93 | 93 | 93 |
| Cell density ($\times 10^4$ cells/m$^2$) of Second cell density section | 62 | 62 | 62 | 62 | 62 | 62 | 62 | 62 | 62 | 62 | 62 |
| Boundary wall | P | N | N | P | P | P | P | P | P | P | P |
| Connection cell | N | N | N | P | P | P | P | P | P | P | P |
| Minimum diameter (mm) of Inscribed circle of Boundary cell (Connection cell) | 0.2 | — | — | 0.24 | 0.45 | 0.50 | 0.75 | 0.99 | 0.75 | 0.75 | 0.75 |
| Radius of Curvature (mm) of Corner section of Boundary cell adjacently in contact with Boundary wall | 0.05 | — | — | 0.03 | 0.03 | 0.03 | 0.03 | 0.03 | 0.05 | 0.15 | 0.34 |
| Evaluation result in Catalyst clogging | D | B | A | C | B | A | A | A | A | A | A |
| Isostatic strength ratio | 1 | 0.14 | 0.29 | 0.98 | 0.78 | 0.76 | 0.53 | 0.45 | 0.70 | 0.80 | 0.88 |
| Pressure loss ratio | 1 | 0.94 | 0.91 | 0.99 | 0.98 | 0.94 | 0.92 | 0.93 | 0.93 | 0.92 | 0.92 |

P: Presence, N: None.

The honeycomb structural body 1 (test samples E1 to E6 and comparative samples C4 and C5) has the connection cells 211 as the boundary cells 21 which are in contact with the boundary wall 14. That is, as can be clearly understood from the results shown in Table 1, the structure of the honeycomb structural body 1 shown in FIG. 1, FIG. 2 and FIG. 3 (as test samples E1 to E6 and comparative samples C4 and C5) can suppress occurrence of catalyst clogging in cells, i.e. generation of catalyst-clogged cells such as the boundary cells 21, and reduce its pressure loss (or have a low pressure loss) when compared with the comparative sample C1 without having any connection cell in contact with the boundary wall. Furthermore, the honeycomb structural body 1 (test samples E1 to E6 and comparative samples C4 and C5) has an increased mechanical strength because of having the boundary wall 14 when compared with mechanical strength of the comparative samples C2 and C3 which have no boundary wall.

As previously explained, the honeycomb structural body 1 (test samples E1 to E6 and comparative samples C3 and C5) has an increased mechanical strength because of having the boundary wall 14 having a cylindrical shape formed between the cell density sections 12. That is, the cell density sections 12 are adjacent to each other through the boundary wall. This structure having the boundary wall makes it possible to prevent the honeycomb structural body 1 from being broken, etc. the structure of the honeycomb structural body 1 shown in FIG. 1 to FIG. 3 makes it possible to prevent deterioration of a roundness during the manufacturing of the honeycomb structural body 1. This makes it possible to provide a high productivity of producing the honeycomb structural body. Still further, the honeycomb structural body 1 has a plurality of the cell density sections 12 having different cell densities formed from the central point O to the outer peripheral wall 10 in the radial direction Y, which is a radial cross section perpendicular to the axial direction X of the honeycomb structural body 1. This structure makes it possible to allow uniform distribution of a flowing speed of exhaust gas in a radial cross section of the honeycomb structural body 1.

Each of the boundary cells 21 in contact with the boundary wall 14 in the honeycomb structural body 1 is comprised of the connection cells 211 (see FIG. 2 to FIG. 4) which are formed by combining a plurality of the cells. This structure makes it possible to avoid generation of small sized cells (imperfect cells), which occurs catalyst clogging in the boundary cell 21 formed adjacently the boundary wall 14 (like the comparative sample C1 shown in FIG. 5 and FIG. 6). It is accordingly possible for the structure of the honeycomb structural body 1 to prevent occurrence of catalyst clogging in the boundary cells 21 and have a reduced pressure loss.

In addition, as can be understood from the results shown in Table 1, no catalyst clogging occurs in cells, i.e. no catalyst-clogged cell has observed in a radial cross section perpendicular to the axial direction X of the honeycomb structural body 1 (test samples E1 to E6) having the boundary cells 21, a diameter of an inscribed circle 210 of each boundary cell 21 is not less than 0.5 mm. That is, catalyst clogging does not occur in any cell formed in the honeycomb structural body 1 (test samples E1 to E6). Accordingly, as previously described, the boundary cell 21 is formed by combining adjacent two cells to form the connection cell 211 having a large size. It is possible to prevent generation of catalyst clogging in the cells, i.e. catalyst-clogged cells when the inscribed circle 210 of the boundary cell 211 has a diameter of not less than 0.5 mm.

Form the viewpoint of reducing the pressure loss of the honeycomb structural body, it is preferable for the inscribed circle 210 of the boundary cell 21 to have a diameter of not less than 0.7 mm, more preferable to have a diameter of not less than 0.9 mm.

On the other hand, from the point of view of increasing mechanical strength, it is preferable for the inscribed circle 210 of the boundary cell 21 to have a diameter of not more than 1 mm, more preferable to have a diameter of not more than 0.75 mm.

It is possible to form each boundary cell 21 by using the connection cell 211 only, or some of the boundary cells 21 by using the connection cell 211. That is, it is possible that each of boundary cells in at least some of the boundary cells 21 is formed by using the connection cell 211, and each of the boundary cells 21 in the remaining part is formed by using the usual interior cell 22. It is possible to avoid occurrence of catalyst clogging when the inscribed circle 210 of the boundary cell 21 has a diameter D of not less than 0.5 mm in spite of using the connection cell 211.

Like the inscribed circle 210 of the boundary cell 21 previously described, when an inscribed circle (not shown) of the interior cell 22 is considered in the honeycomb structure body according to the first exemplary embodiment and the second and third exemplary embodiments (which will be explained later), the inscribed circle of the interior cell 22 in each of the cell density sections 121 and 122 has a diameter of not less than 0.5 mm.

As can be understood from the results shown in Table 1, like the structure of each of the test samples E1 to E6 according to the first exemplary embodiment previously described, when the corner section 218 which is in contact adjacently with the boundary wall 14 in the boundary cell 21 has a radius of curvature of not less than 0.05 mm, this structure makes it possible to increase the mechanical strength of the honeycomb structure body 1. It is preferable for the corner section 218 to have a radius of curvature of not less than 0.15 mm, and more preferable to have a radius of curvature of not less than 0.25 mm.

As shown in FIG. 2, in the structure of the honeycomb structure body 1 according to the first exemplary embodiment, the cells 2 formed in the first cell density section 121 are arranged in a first direction which is different from a second direction of the cells 2 arranged in the second cell density section 122. Specifically, the cells 2 in the second cell density section 122 are inclined to the cells 2 in the first cell density section 121 by 45 degrees. The concept of the present invention is not limited by this structure.

Figure 10:
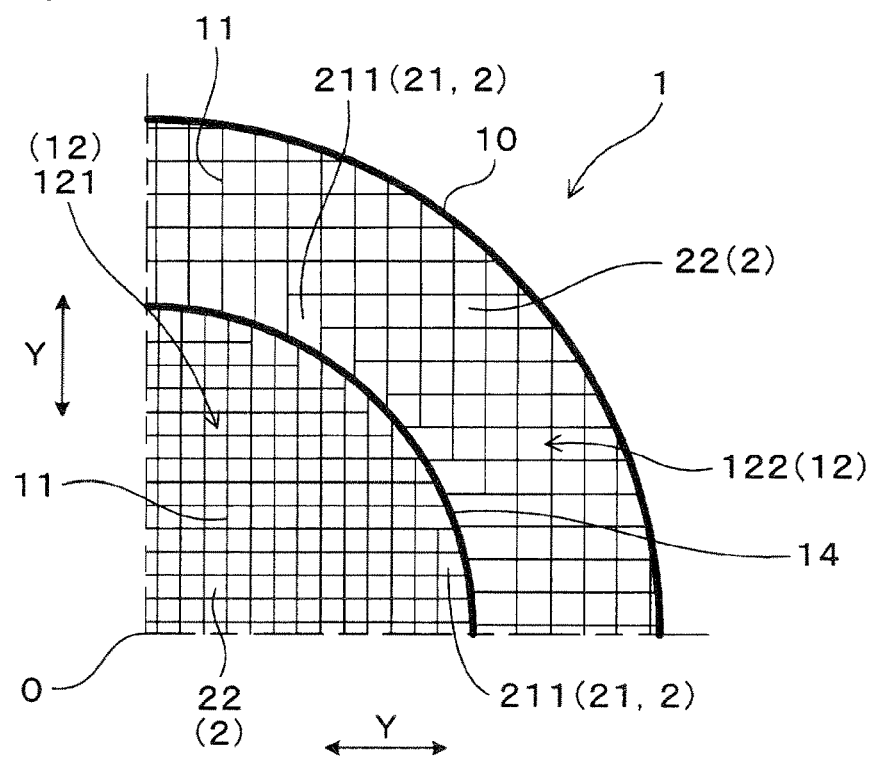
FIG. 10 is a view showing a partial cross section in a radial direction of the honeycomb structure body according to the first exemplary embodiment in which the cells formed in the first cell density section and the cells formed in the second cell density section are inclined in the same direction, where the first cell density section and the second cell density section have different cell densities.

FIG. 10 is a view showing a partial cross section in a radial direction of the honeycomb structure body according to the first exemplary embodiment in which the cells 2 formed in the first cell density section 121 and the cells 2 formed in the second cell density section 122 are inclined in the same direction, where the first cell density sections 121 and the second cell density section 122 have different cell densities.

That is, it is acceptable for the cells 2 in the first cell density section 121 and the cells 2 in the second cell density section 122 to have a same slope of an optional degree. For example, the cells 2 in the first cell density section 121 and the cells 2 in the second cell density section 122 are the same slope, i.e. are inclined by the same degrees, as shown in FIG. 10 (which will be explained later in detail).

Figure 11:
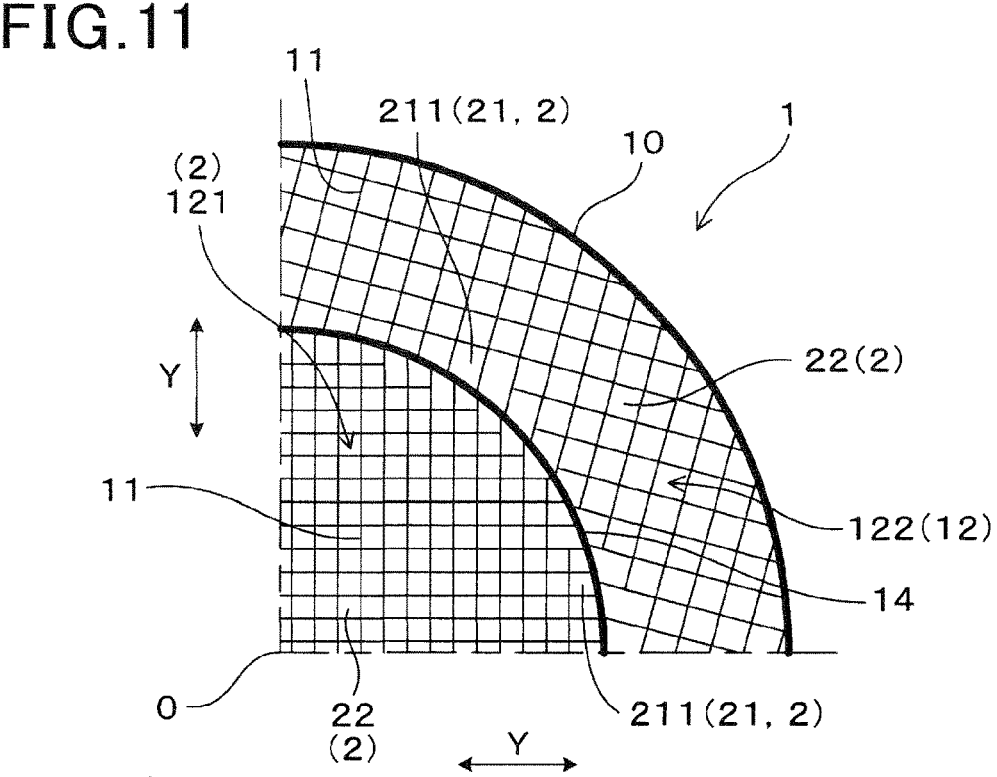
FIG. 11 is a view showing a partial cross section in a radial direction of the honeycomb structure body according to the first exemplary embodiment in which the cells formed in the first cell density section are inclined by an inclined degree which is less than an inclined degree of the cells formed in the second cell density section, where the first cell density section and the second cell density section have different cell densities.

FIG. 11 is a view showing a partial cross section in a radial direction of the honeycomb structure body according to the first exemplary embodiment in which the cells 2 formed in the first cell density section 121 are inclined by a degree of less than 45 degrees to the cells 2 formed in the second cell density section 122, where the first cell density sections 121 and the second cell density section 122 have different cell densities.

That is, it is acceptable for the honeycomb structure body to have a structure in which the cells 2 formed in the first cell density section 121 are inclined by a degree of less than 45 degrees to the cells 2 formed in the second cell density section 122, as shown in FIG. 11 (which will be explained later in detail).

From the point of view of obtaining and maintaining an adequately mechanical strength of the honeycomb structure body 1, it is preferable that the cells 2 in the first cell density section 121 are inclined by 45 degrees to the cells 2 in the second cell density section 122.

The first exemplary embodiment shows the structure of the honeycomb structure body 1 having the first cell density section 121 and the second cell density section 122. However, the concept of the present invention is not limited by this. For example, it is possible for the honeycomb structure body to have not less than three cell density sections having different cell densities. In the structure having not less than three cell density sections, it can be considered that the cell density of each of the cell density sections is decreased from the central point O to the outer peripheral wall along a radial direction of the honeycomb structure body.

As previously described in detail, the first exemplary embodiment can provide the honeycomb structure body 1 (test samples E1 to E6) having an improved structure and excellent functions capable of preventing occurrence of catalyst clogging and reducing a pressure loss.

Second Exemplary Embodiment

A description will be given of the honeycomb structure body according to the second exemplary embodiment.

The honeycomb structure body according to the second exemplary embodiment (test samples E7 to E10, and comparative samples C6 to C9) has the first and second cell density sections having different cell densities.

In particular, the first cell density section in the honeycomb structure body (test samples E7 to E10, and comparative samples C6 to C9) according to the second exemplary embodiment is different in cell density from the first cell density section of the honeycomb structure body according to the first exemplary embodiment (test samples E1 to E6, and comparative samples C1 to C5). Further, the second cell density section in the honeycomb structure body (test samples E7 to E10, and comparative samples C6 to C9) according to the second exemplary embodiment is different in cell density from the second cell density section of the honeycomb structure body (test samples E1 to E6, and comparative samples C1 to C5) according to the first exemplary embodiment.

The second exemplary embodiment produced the honeycomb structure body (the test samples E7 to E10 and the comparative samples C6 and C9) by the same method performed by the first exemplary embodiment previously described.

Other components of the honeycomb structure body according to the second exemplary embodiment are the same as those of the honeycomb structure body previously described. Accordingly, the explanation of the same components is omitted here for brevity.

Similar to Table 1, as previously described, Table 2 shows the detected parameters of each of the test samples E7 to E10 and the comparative samples C6 to C9:
(a1) Cell density ($\times 10^4$ cells/m$^2$) of first cell density section;
(a2) Cell density ($\times 10^4$ cells/m$^2$) of second cell density section;
(a3) Presence of boundary cell;
(a4) Presence of connection cell
(a5) Minimum diameter D (mm) of inscribed circle in boundary cell (formed by connection cell);
(a6) Radius of curvature (mm) of corner section of boundary cell arranged adjacent to boundary wall;
(a7) Evaluation result in catalyst clogging in cell;
(a8) Isostatic strength ratio; and
(a9) Pressure loss ratio.

TABLE 2

| Sample No. | C6 | C7 | C8 | C9 | E7 | E8 | E9 | E10 |
|---|---|---|---|---|---|---|---|---|
| Cell density ($\times 10^4$ cells/m$^2$) of First cell density section | 116 | 116 | 116 | 116 | 116 | 116 | 116 | 116 |

TABLE 2-continued

| Sample No. | C6 | C7 | C8 | C9 | E7 | E8 | E9 | E10 |
|---|---|---|---|---|---|---|---|---|
| Cell density (× 10⁴ cells/m²) of Second cell density section | 93 | 93 | 93 | 93 | 93 | 93 | 93 | 93 |
| Boundary wall | P | N | N | P | P | P | P | P |
| Connection cell | N | N | N | P | P | P | P | P |
| Minimum diameter (mm) of Inscribed circle of Boundary cell (Connection cell) | 0.2 | — | — | 0.45 | 0.50 | 0.75 | 0.75 | 0.75 |
| Radius of Curvature (mm) of Corner section of Boundary cell adjacently in contact with Boundary wall | 0.05 | — | — | 0.03 | 0.03 | 0.03 | 0.05 | 0.15 |
| Evaluation result in Catalyst clogging | D | B | A | B | A | A | A | A |
| Isostatic strength ratio | 1 | 0.17 | 0.32 | 0.83 | 0.82 | 0.69 | 0.72 | 0.84 |
| Pressure loss ratio | 1 | 0.99 | 0.92 | 0.95 | 0.94 | 0.93 | 0.93 | 0.94 |

P: Presence, N: None.

As can be understood from the results shown in Table 2, the honeycomb structure body (test samples E7 to E10), like the honeycomb structure body (test samples E1 to E6), has an increased mechanical strength, prevents occurrence of catalyst clogging, and reduces its pressure loss when compared in these properties with the comparative samples C6 to C9. In other words, the honeycomb structure body (test samples E7 to E10) according to the second exemplary embodiment has the same effects as the honeycomb structure body (test samples E1 to E6) according to the first exemplary embodiment.

Third Exemplary Embodiment

A description will be given of the honeycomb structure body according to the third exemplary embodiment.

The honeycomb structure body according to the second exemplary embodiment (test samples E11 to E14, and comparative samples C10 to C13) has two cell density sections, each having a different cell density. In particular, the first cell density section in the honeycomb structure body according to the third exemplary embodiment (test samples E11 to E14, and comparative samples C10 to C13) is different in cell density from the first cell density section of the honeycomb structure body according to the first and second exemplary embodiment previously described. Further, the second cell density section in the honeycomb structure body according to the third exemplary embodiment (test samples E11 to E14, and comparative samples C10 to C13) is different in cell density from the second cell density section of the honeycomb structure body according to the first and second exemplary embodiment previously described.

The third exemplary embodiment produced the honeycomb structure body (test samples E11 to E14, and comparative samples C10 and C13) by the same method performed by the first exemplary embodiment previously described.

Other components of the honeycomb structure body according to the third exemplary embodiment are the same structure as the honeycomb structure body previously explained. Accordingly, the explanation of the same components is omitted here for brevity.

Similar to Table 1 and Table 2, as previously described, Table 3 shows the detected parameters of each of the test samples E11 to E14 and the comparative samples C10 to C13:

(a1) Cell density (×10⁴ cells/m²) of first cell density section;
(a2) Cell density (×10⁴ cells/m²) of second cell density section;
(a3) Presence of boundary cell;
(a4) Presence of connection cell;
(a5) Minimum diameter D (mm) of inscribed circle in boundary cell (formed by connection cell);
(a6) Radius of curvature (mm) of corner section of boundary cell arranged adjacent to boundary wall;
(a7) Evaluation result in catalyst clogging in cell;
(a8) Isostatic strength ratio; and
(a9) Pressure loss ratio.

TABLE 3

| Sample No. | C10 | C11 | C12 | C13 | E11 | E12 | E13 | E14 |
|---|---|---|---|---|---|---|---|---|
| Cell density (× 10⁴ cells/m²) of First cell density section | 62 | 62 | 62 | 62 | 62 | 62 | 62 | 62 |
| Cell density (× 10⁴ cells/m²) of Second cell density section | 47 | 47 | 47 | 47 | 47 | 47 | 47 | 47 |
| Boundary wall | P | N | N | P | P | P | P | P |
| Connection cell | N | N | N | P | P | P | P | P |
| Minimum diameter (mm) of Inscribed circle of Boundary cell (Connection cell) | 0.2 | — | — | 0.46 | 0.50 | 0.75 | 0.75 | 0.75 |
| Radius of Curvature (mm) of Corner section of Boundary cell adjacently in contact with Boundary wall | 0.05 | — | — | 0.03 | 0.03 | 0.03 | 0.05 | 0.15 |
| Evaluation result in Catalyst clogging | C | B | A | B | A | A | A | A |
| Isostatic strength ratio | 1 | 0.11 | 0.29 | 0.68 | 0.62 | 0.47 | 0.56 | 0.69 |
| Pressure loss ratio | 1 | 0.93 | 0.88 | 0.92 | 0.90 | 0.89 | 0.89 | 0.90 |

P: Presence, N: None.

As can be shown in Table 3 and clearly understood from the results shown in Table 3, the honeycomb structure body (test samples E11 to E14) according to the third exemplary embodiment, like the honeycomb structure body (the test samples E1 to E6), has an increased mechanical strength, prevents occurrence of catalyst clogging in the cells, in particular in the boundary cells, and reduces its pressure loss when compared in these properties with the comparative samples C10 to C13. In other words, the honeycomb structure body (test samples E11 to E14) according to the third exemplary embodiment has the same effects as the honeycomb structure body (test samples E1 to E6) according to the first exemplary embodiment.

Fourth Exemplary Embodiment

A description will be given of the honeycomb structure body according to the fourth exemplary embodiment with reference to FIG. 12, FIG. 13 and Table 4.

Figure 12:
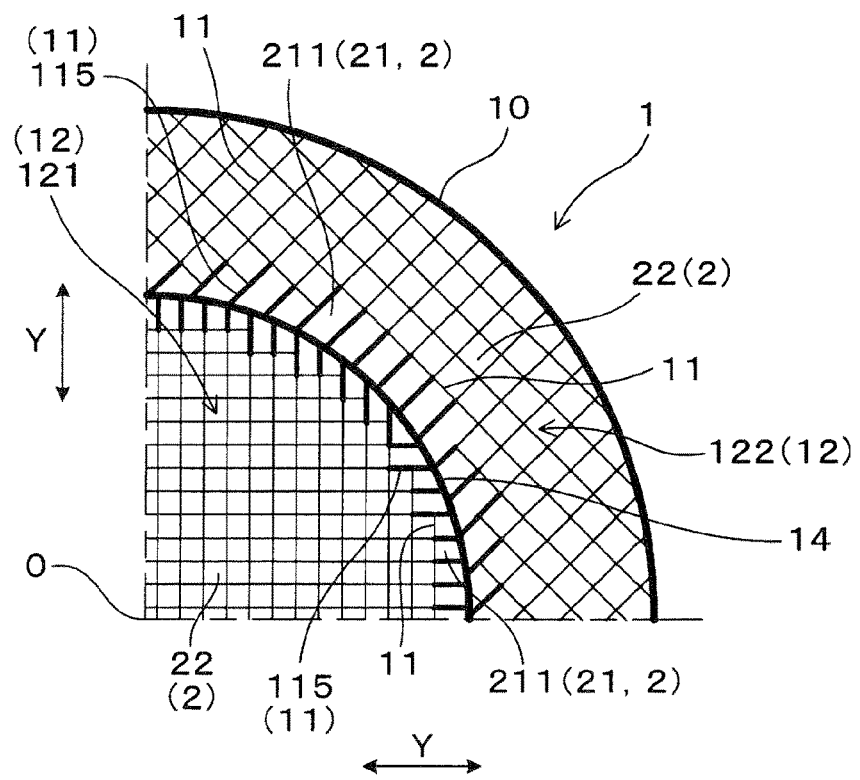
FIG. 12 is a view showing a partial cross section in a radial direction of the honeycomb structure body (test sample E15) according to a fourth exemplary embodiment having reinforced partition walls of a large thickness.

FIG. 12 is a view showing a partial cross section in a radial direction of a honeycomb structure body (test sample E15) according to the fourth exemplary embodiment having reinforced partition walls 115 of a large thickness. FIG. 13 is a view showing an enlarged partial cross section in a radial direction of the honeycomb structure body (test sample E15) having the reinforced partition walls 115 of a large thickness according to the fourth exemplary embodiment shown in FIG. 12.

Figure 13:
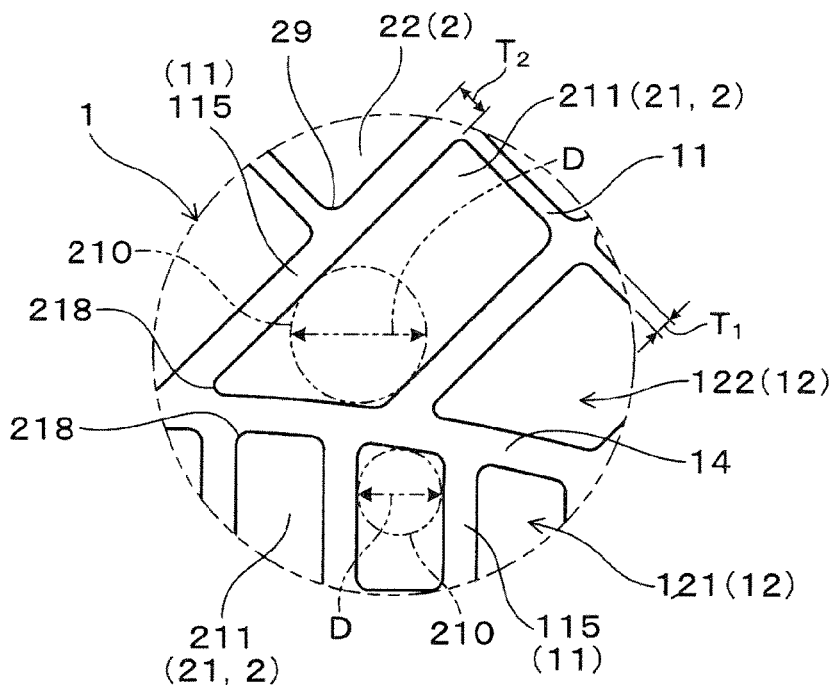
FIG. 13 is a view showing an enlarged partial cross section in a radial direction of the honeycomb structure body (test sample E15) according to the fourth exemplary embodiment, having the reinforced partition walls of a large thickness shown in FIG. 12.

Specifically, as shown in FIG. 12 and FIG. 13, in the structure of the honeycomb structure body (test sample E15) according to the fourth exemplary embodiment, the partition wall 115 extending to and in contact with the boundary wall 14 has a thickness $T_2$ which is larger than a thickness $T_1$ of the partition wall 11 forming the interior cell 122. The partition wall 115 having the thickness $T_2$ will be referred to as the "reinforced partition wall 115".

Other components of the honeycomb structure body (test sample E15) according to the fourth exemplary embodiment are the same of those of the honeycomb structure body previously explained. Accordingly, the explanation of the same components is omitted here for brevity. The honeycomb structure body (test sample E15) has the connection cells 211, like the structure of each of the honeycomb structure bodies (test samples E1 to E6).

It is possible to produce the test sample E15 by the same method of producing the honeycomb structure body (test samples E1 to E6 according to the first exemplary embodiment) using a metal die having a specific structure in which slit grooves of the metal die corresponding to the reinforced partition walls 115 have a specific width which is wider than a width of the partition walls 11. Each of the partition walls 11, other than the reinforced partition walls 115, in the test sample E15 has the same width of the partition walls in the honeycomb structure body (test samples E1 to E6) according to the first exemplary embodiment previously described. Other components of the test sample E15 according to the fourth exemplary embodiment are the same as those of the test samples E1 to E6 according to the first exemplary embodiment. The same components between the test sample E15 and the test samples E1 to E6 are designated by the same reference numbers and characters. The explanation of these same components is omitted for brevity.

The fourth exemplary embodiment produced the test sample E16 which has no reinforced partition walls 115. Other components of the test sample E16 are the same as those of the test sample E15.

Further, the fourth exemplary embodiment evaluated occurrence of catalyst clogging in the boundary cells 21 of the test sample E15 and the test sample E16 by using the same method of the first exemplary embodiment previously described. Table 4 shows the evaluation results of the test sample E15 and the test sample E16 regarding an isostatic strength ratio and a pressure loss ratio to the comparative sample C1.

That is, Table 4 shows the detected parameters of each of the test sample E15, the test sample E16 and the comparative sample C1:

(a1) Cell density ($\times 10^4$ cells/$m^2$) of first cell density section;
(a2) Cell density ($\times 10^4$ cells/$m^2$) of second cell density section;
(a4) Presence of connection cell
(a5) Minimum diameter D (mm) of inscribed circle in boundary cell (formed by connection cell);
(a6) Radius of curvature (mm) of corner section of boundary cell arranged adjacent to boundary wall;
(a10) Ratio $T_2/T_1$ of thickness $T_2$ of partition wall 115 extending to boundary wall 14 to thickness $T_1$ of partition wall 11;
(a7) Evaluation result in catalyst clogging in cell;
(a8) Isostatic strength ratio; and
(a9) Pressure loss ratio.

TABLE 4

| Sample No. | C1 | E15 | E16 |
|---|---|---|---|
| Cell density ($\times 10^4$ cells/$m^2$) of First cell density section | 93 | 93 | 93 |
| Cell density ($\times 10^4$ cells/$m^2$) of Second cell density section | 62 | 62 | 62 |
| Connection cell | N | P | P |
| Minimum diameter (mm) of Inscribed circle of Boundary cell (Connection cell) | 0.20 | 0.50 | 0.50 |
| Radius of Curvature (mm) of Corner section of Boundary cell adjacently in contact with Boundary wall | 0.05 | 0.05 | 0.05 |
| Ratio $T_2/T_1$ | 1.00 | 1.52 | 1.00 |
| Evaluation result in Catalyst clogging | D | A | A |
| Isostatic strength ratio | 1 | 0.91 | 0.76 |
| Pressure loss ratio | 1 | 0.94 | 0.94 |

P: Presence, N: None.

As can be shown in Table 4 and clearly understood from the results shown in Table 4, the test sample E15 and the test sample E16 according to the fourth exemplary embodiment are the same evaluation results in catalyst clogging and pressure loss of the test samples E1 to E6 according to the first exemplary embodiment. That is, the test samples E15 and E16 have the connection cells 211 as the boundary cells 21, in which an inscribed circle of the boundary cell 21 has not less than 0.5 mm, can suppress occurrence of catalyst clogging in cells and reduce its pressure loss when compared with the comparative sample C1 having the boundary cell, a diameter of an inscribed circle of which is less than 0.5 mm. In addition, the test sample E15 having the reinforced partition walls 115 having an increased width extending to the boundary wall 14 has an increased mechanical strength which is larger than that of the test sample E16 without any reinforced partition wall. As a result, it is preferable for the honeycomb structure body to have the reinforced partition walls having an increased width which extends to the boundary wall 14.

Fifth Exemplary Embodiment

A description will be given of the honeycomb structure body according to the fifth exemplary embodiment with reference to FIG. 14 to FIG. 19 and Table 5.

Figure 14:
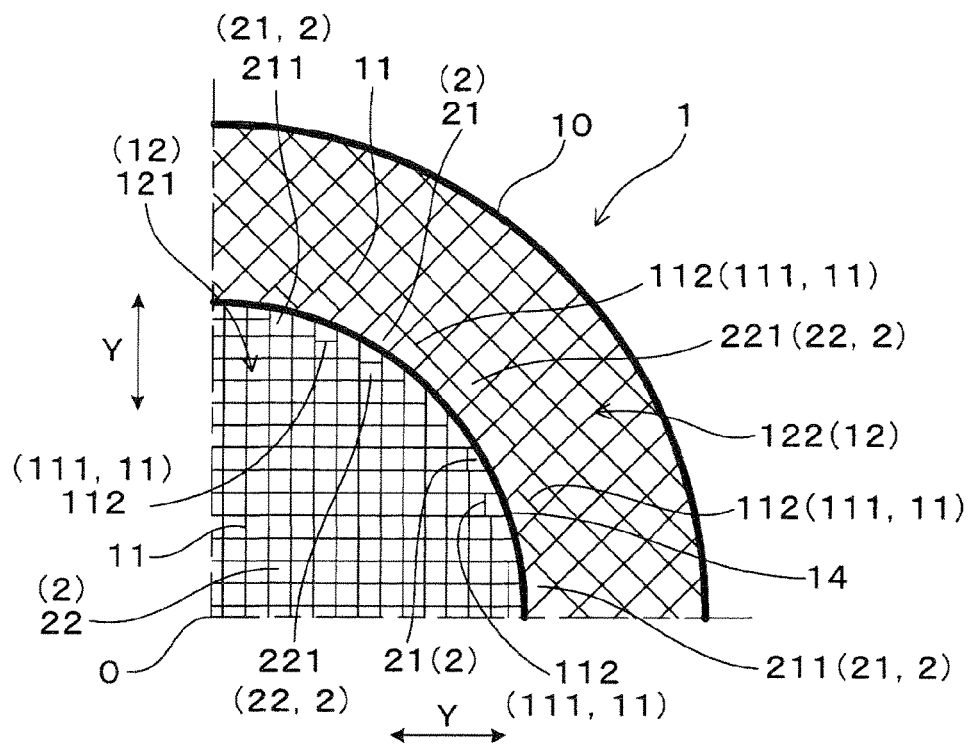
FIG. 14 is a view showing a partial cross section in a radial direction of the honeycomb structure body (test sample E17) according to a fifth exemplary embodiment having relocated partition walls.
Figure 15:
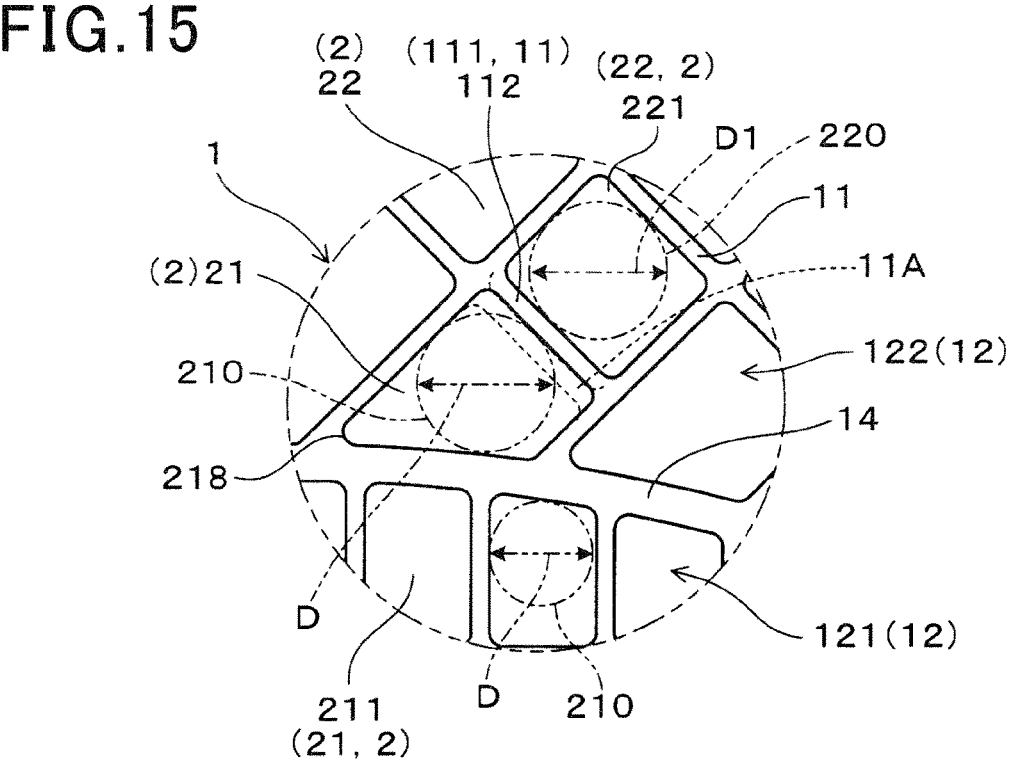
FIG. 15 is a view showing an enlarged partial cross section in a radial direction of the honeycomb structure body (test sample E17), shown in FIG. 14, according to the fifth exemplary embodiment having the relocated partition walls.

FIG. 14 is a view showing a partial cross section in a radial direction of the honeycomb structure body (test sample E17) according to the fifth exemplary embodiment having relocated partition walls 112. FIG. 15 is a view showing an enlarged partial cross section in a radial direction of the honeycomb structure body (test sample E17), shown in FIG. 14.

As previously described in detail, the first to fourth exemplary embodiments explain the honeycomb structure body having the boundary cells having an increased size and a diameter of an inscribed circle of each boundary cell becomes not less than the predetermined value (0.5 mm).

On the other hand, the fifth exemplary embodiment shows the honeycomb structure body having the relocated partition walls 112. That is, the common use partition wall 111 formed between the boundary cell 21 and the interior cell 221 which is arranged adjacently to the boundary cell 21 is relocated, i.e. moved to increase the overall size (or overall area) of the boundary cell 21. This makes it possible to increase a diameter of an inscribed cell 210 of the boundary cell 21 having an increased size.

As shown in FIG. 14 and FIG. 15, in each of the cell density sections 121 and 122 in the honeycomb structure body, there is a common use partition wall 111 formed between the boundary cell 21 and an adjacent interior cell 221. This adjacent interior cell 221 is arranged in the radial direction adjacently to the boundary cell 21. In each of the common use partition walls 111 as at least some of the common use partition walls 111, the relocated partition wall 112 is formed at a position, which is apart in location from (or offset from) the boundary wall 14 by a predetermined length. That is, the relocated partition wall 112 is formed to be offset from a virtual partition wall 11A designated by the dotted line shown in FIG. 15. The virtual partition wall 11A is formed in the same arrangement pattern of the interior cell 22 formed in the area having the same cell density in each of the cell density sections 121 and 122 in the honeycomb structure body. This makes it possible to increase the diameter D of the inscribed circle 210 of the boundary cell 21 having the relocated partition wall 112. FIG. 15 shows the virtual partition wall 11A which is designated by the dotted line and not formed in an actual honeycomb structure body.

In particular, the relocated partition wall 112 is formed at the same position of the virtual partition wall 11A shown in FIG. 4 previously described, as well as in FIG. 21 and FIG. 23 according to a sixth exemplary embodiment which will be explained later.

As shown in FIG. 14, the partition walls 11 having a rectangle shape are arranged so that each of the cell density sections 121 and 122 in the honeycomb structure body has a predetermined cell density. That is, in each of the cell density sections 121 and 122 in the honeycomb structure body, a large part of the partition walls 11 are formed in a predetermined lattice pattern. In addition to this arrangement of the partition walls 11, the honeycomb structure body according to the fifth exemplary embodiment has the relocated partition walls 112 formed in a specific lattice pattern different from the predetermined lattice pattern of the partition walls 11. As clearly shown in FIG. 15, each of the relocated partition walls 112 is formed at the location of the virtual partition wall 11A if the relocated partition wall 112 is formed in the predetermined lattice pattern like the partition walls 11. However, if the relocated partition wall 112 is formed at the location of the virtual partition wall 11A, the boundary cell 21 has a reduced size or area and a diameter D of the inscribed circle of the boundary cell 21 is reduced, for example, less than 0.5 mm.

In the structure of the honeycomb structure body according to the fifth exemplary embodiment, each of common use partition walls in at least some of the common use partition walls 111 is relocated as the relocated partition walls 112 which are apart in location from (or offset from) the boundary wall 14. This makes it possible to increase an overall size of each boundary cell 21, as shown in FIG. 14 and FIG. 15.

Specifically, in each of the cell density sections 121 and 122 in the honeycomb structure body, the common use partition wall 111 is formed at a relocated position in each of the boundary cells 21 so as to be offset from the boundary wall 14, where the common use partition wall 111 has a reduced size when the common use partition wall 111 is formed in the predetermined lattice pattern.

The formation of the relocated partition wall 112 reduces an overall size of the adjacent interior cell 221 which is formed adjacent to the boundary cell 21, On the other hand, the overall size of the boundary cell 21 can be reduced.

When the boundary cell 21 has an inscribed circle having a diameter of less than the predetermined value (for example, 0.5 mm) if the virtual partition wall 11A is formed in each of the boundary cells 21, it is possible for the boundary cell 21 to have an inscribed circle having a diameter D of not less than the predetermined value by replacing the common use partition wall 111 with the relocated partition wall 112, i.e. by moving the common use partition wall 111 to the location of the relocated partition wall 112 which is offset from the boundary wall 14.

It is possible to enlarge the size of each of the boundary cells 21 without reducing the size of the adjacent interior cell 221 by adjusting the location of forming the relocated partition wall 112. Specifically, it is possible for the adjacent interior cell 221 to have an inscribed circle 220 having a diameter D1 of not less than 0.5 mm and for the boundary cell 21 to have an inscribed circle 210 having a diameter D1 of not less than 0.5 mm. This structure of the honeycomb structure body makes it possible to prevent occurrence of catalyst clogging in the adjacent interior cells 221 in addition to the boundary cells 21.

Still further, it is possible for each of all of the boundary cells 21 to have an inscribed circle having a diameter D of not less than the predetermined value (for example, less than 0.5 mm) by combining the formation of the relocated partition wall 112 with the formation of the connection cell 211, like the honeycomb structure body according to the first to fourth exemplary embodiment previously described which forms a part of the boundary cell 21 by using the connection cell 211. For example, FIG. 14 and FIG. 15 show an example of forming the relocated partition wall 112 to which the common use partition wall 111 has relocated and further forming the connection cell 211 by eliminating the common use partition wall 111. This makes it possible to easily increase the diameter D of the inscribed circle 210 of the boundary cell 21 to be not less than 0.5 mm, and further to easily increase the diameter of the inscribed circle 220 of the adjacent interior cell 221 to be not less than 0.5 mm, for example.

Still further, it is possible to increase the size of the boundary cell to be not less than a predetermined value by forming the relocated partition wall 112 without using any connection cell 211. The relocated partition wall 112 is formed without using any connection cell 211 by adjusting a formation pattern of the partition walls 11 in each of the cell density sections 121 and 122.

Other components of the honeycomb structure body according to the fifth exemplary embodiment are the same as those of the honeycomb structure body according to the first exemplary embodiment previously described. Accordingly, the explanation of the same components is omitted here for brevity.

The fifth exemplary embodiment produced two types of honeycomb structure bodies (test sample E17 and comparative sample C14), each of which had the boundary cell 21 and the inscribed circle 210 of the boundary cell 21 had an increased diameter D.

The test sample E17 is a honeycomb structure body having the boundary cells 21, each of the boundary cells 21 has the inscribed circle 210 having the diameter D of not less than 0.5 mm (minimum value is 0.5 mm). On the other hand, the comparative sample C14 is a honeycomb structure body having the boundary cells 21, each of the boundary cells 21 has the inscribed circle 210 having the diameter D of not less than 0.4 mm (minimum value is 0.4 mm).

Figure 16:
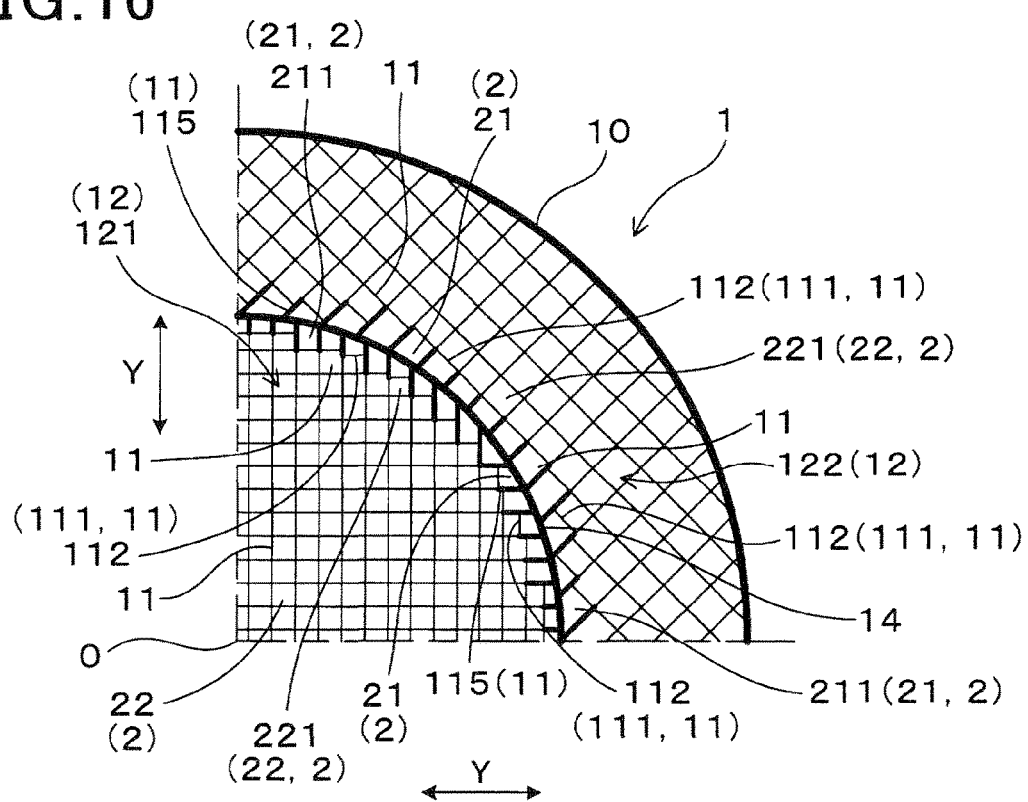
FIG. 16 is a view showing a partial cross section in a radial direction of the honeycomb structure body (test sample E18) according to the fifth exemplary embodiment having relocated partition walls and reinforced partition walls of a large thickness extending to the boundary wall.
Figure 17:
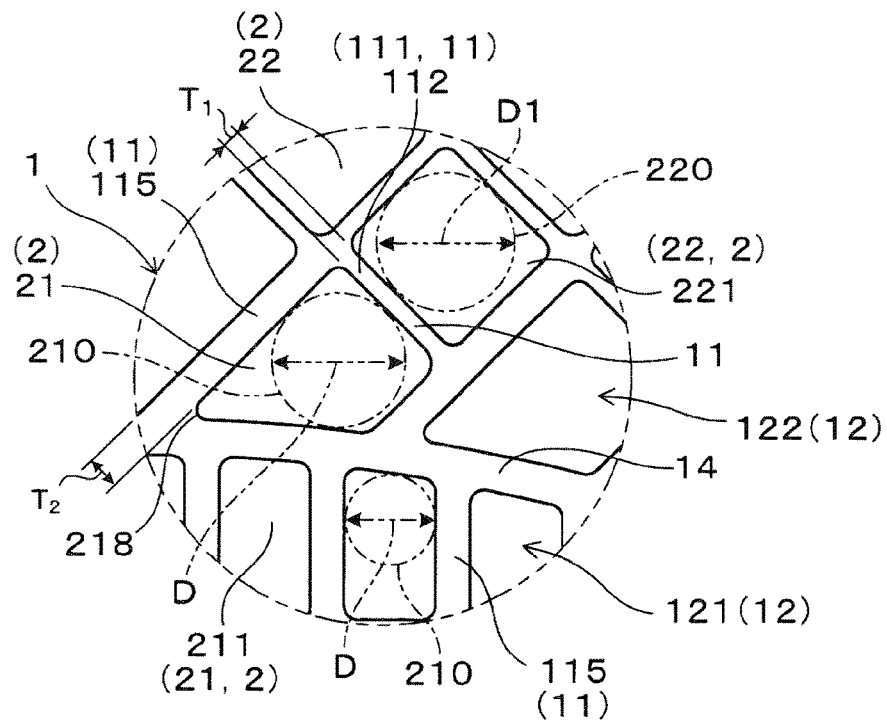
FIG. 17 is a view showing an enlarged partial cross section in a radial direction of the honeycomb structure body according to the fifth exemplary embodiment having the relocated partition walls and the reinforced partition walls of a large thickness extending to the boundary wall shown in FIG. 16.

FIG. 16 is a view showing a partial cross section in a radial direction of the honeycomb structure body (test sample E18) according to the fifth exemplary embodiment having the relocated partition walls 112 of a large thickness extending to the boundary wall 14. FIG. 17 is a view showing an enlarged partial cross section in a radial direction of the honeycomb structure body according to the fifth exemplary embodiment having the relocated partition walls 112 of a large thickness extending to the boundary wall 14 shown in FIG. 6.

The fifth exemplary embodiment further produced a honeycomb structure body (test sample E18), which had the reinforced partition walls 115, like the fourth exemplary embodiment previously described. Like the structure of the test sample E17, the test sample E18 had the relocated partition walls 112 in order to increase the diameter D of the inscribed circle 210 of the boundary cell 21 to be not less than 0.5 mm. Still further, like the structure of the test sample E15 used in the fourth exemplary embodiment, the test sample E18 had the reinforced partition walls 115 extending to the boundary wall 14.

The fifth exemplary embodiment further produced honeycomb structure bodies (test sample E19, comparative sample C15, test sample E20 and comparative sample C16) having the first cell density section and the second cell density section which are different in cell density from those of the test sample E17 and the comparative sample C14. In particular, the test sample E19 and the test sample E20 had the same structure as the test sample E17 excepting the cell density of the first cell density section and the second cell density section. On the other hand, the comparative sample C15 and the comparative sample C16 had the same structure as the comparative sample C14 excepting the cell density of the first cell density section and the second cell density section.

Table 5 shows various parameters and evaluation results of the test samples E17 to E20, and the comparative samples C14 to C16 as follows:

(a1) Cell density ($\times 10^4$ cells/m$^2$) of first cell density section;
(a2) Cell density ($\times 10^4$ cells/m$^2$) of second cell density section;
(a11) Presence of relocated partition walls;
(a5) Minimum diameter D (mm) of inscribed circle of boundary cell;
(a6) Radius of Curvature (mm) of corner section of boundary cell adjacently and in contact with boundary wall;
(a10) Ratio $T_2/T_1$, where $T_1$ indicates thickness of partition wall 11 and $T_2$ indicates thickness of partition wall 115 extending to boundary wall 14;
(a8) Isostatic strength ratio;
(a7) Evaluation result in catalyst clogging in cell; and
(a9) Pressure loss ratio.

It had been adjusted so that in the test samples E17 to E20 having the relocated partition walls 112 and the boundary cells 21, the diameter D of the inscribed circle 210 of the boundary cell 21 was not less than 0.5 mm, and the inscribed circle 220 of the adjacent interior cell 221 had the diameter D1 of not less than 0.5 mm (which are omitted from Table 5).

Still further, like the first exemplary embodiment, the fifth exemplary embodiment evaluated each of the test samples E17 to E20, and the comparative samples C14 to C16 regarding the isostatic strength ratio, the catalyst clogging and the pressure loss ratio. Table 5 shows these evaluation results. Further, Table 5 shows the evaluation results and various parameter of the comparative samples C1 used in the first exemplary embodiment, the comparative samples C6 used in the second exemplary embodiment, and the comparative samples C10 used in the third exemplary embodiment.

TABLE 5

| Sample No. | C1 | C14 | E17 | E18 | C6 | C15 | E19 | C10 | C16 | E20 |
|---|---|---|---|---|---|---|---|---|---|---|
| Cell density ($\times 10^4$ cells/m$^2$) of First cell density section | 93 | 93 | 93 | 93 | 116 | 116 | 116 | 62 | 62 | 62 |
| Cell density ($\times 10^4$ cells/m$^2$) of Second cell density section | 62 | 62 | 62 | 62 | 93 | 93 | 93 | 47 | 47 | 47 |
| Relocated partition wall | N | P | P | P | N | P | P | N | P | P |
| Minimum diameter (mm) of Inscribed circle of Boundary cell | 0.2 | 0.4 | 0.5 | 0.5 | 0.2 | 0.4 | 0.5 | 0.2 | 0.4 | 0.5 |
| Radius of Curvature (mm) of Corner section of Boundary cell adjacently in contact with Boundary wall | 0.05 | 0.05 | 0.05 | 0.05 | 0.05 | 0.05 | 0.05 | 0.05 | 0.05 | 0.05 |

TABLE 5-continued

| Sample No. | C1 | C14 | E17 | E18 | C6 | C15 | E19 | C10 | C16 | E20 |
|---|---|---|---|---|---|---|---|---|---|---|
| Ratio $T_2/T_1$ | 1.00 | 1.00 | 1.00 | 1.52 | 1.00 | 1.00 | 1.00 | 1.00 | 1.00 | 1.00 |
| Isostatic strength ratio | 1 | 0.82 | 0.81 | 1.00 | 1 | 0.87 | 0.83 | 1 | 0.81 | 0.71 |
| Evaluation result in Catalyst clogging | D | B | A | A | D | B | A | C | B | A |
| Pressure loss ratio | 1 | 0.98 | 0.94 | 0.94 | 1 | 0.99 | 0.95 | 1 | 0.94 | 0.92 |

P: Presence, N: None.

That is, as can be clearly understood from the results shown in Table 5, the structure of each of the test samples E17 to E20, in which the relocated partition walls 112 are formed and each of the boundary cells 21 has its inscribed circle having a diameter of not less than 0.5 mm, can suppress reduction of the mechanical strength, occurrence of catalyst clogging in the boundary cells, and reduce its pressure loss.

Even if having a relocated partition walls 112 as the honeycomb structure body according to the fifth exemplary embodiment, it is possible for a honeycomb structure body to increase its mechanical strength by forming the reinforced partition walls 115, like the structure of forming the connection cells in the honeycomb structure body according to the fourth exemplary embodiment.

Figure 18:
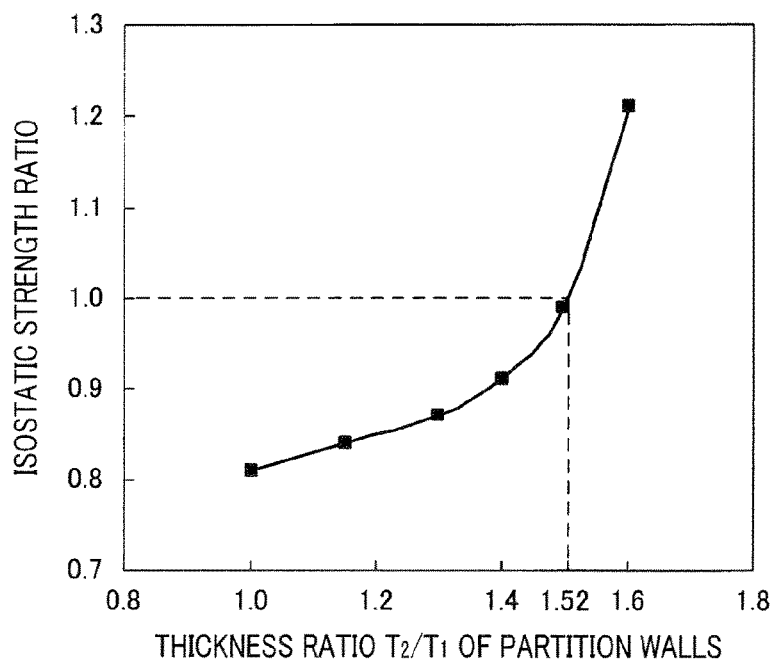
FIG. 18 is a view explaining a relationship between a thickness ratio $T_2/T_1$ of partition walls and an isostatic strength ratio of the honeycomb structure body according to the fifth exemplary embodiment of the present invention.

Further, the fifth exemplary embodiment evaluated the test samples and the comparative samples in optimum thickness ratio $T_2/T_1$. Specifically, the thickness of the partition wall 115 extending to the boundary wall 14 was changed in each of the samples. Other components of these samples are the same of these of the test sample E17. The fifth exemplary embodiment detected a ratio of the isostatic strength of each of the samples to the isostatic strength of the comparative sample C1. The fifth exemplary embodiment detected a relationship between the ratio $T_2/T_1$ in thickness (thickness ratio $T_2/T_1$) and the isostatic strength. FIG. 18 shows the detected relationship.

FIG. 18 is a view explaining a relationship between the thickness ratio $T_2/T_1$ of partition walls and the isostatic strength ratio of the honeycomb structure body according to the fifth exemplary embodiment.

The fifth exemplary embodiment detected a rate of generating molding fault in the test samples and the comparative samples. These samples have the partition walls 115 having a different thickness and each of the partition walls 115 is formed to extend to the boundary wall 14. Specifically, fifth exemplary embodiment detected the number $N_a$ of defects of adjacent interior cells 221 which are arranged adjacent to the boundary cells 21 and the total number $N_b$ of the adjacent interior cells 221 in each of the test samples and the comparative samples. A molding defect was detected on the basis of occurrence of a broken partition wall in the adjacent interior cell and presence of a zigzag pattern in the partition walls 11. When such defects (broken parts and zigzag patterns) were generated in the partition walls forming each of the adjacent interior cells 221, the number of defects is one.

The fifth exemplary embodiment calculated the generation rate of defect in each sample on the basis of the following equation:

Generation rate of detect=$100 \times N_a/N_b$.

The fifth exemplary embodiment obtained a relationship between the thickness ratio $T_2/T_1$ of the partition walls and the calculated generation rate of detect.

Figure 19:
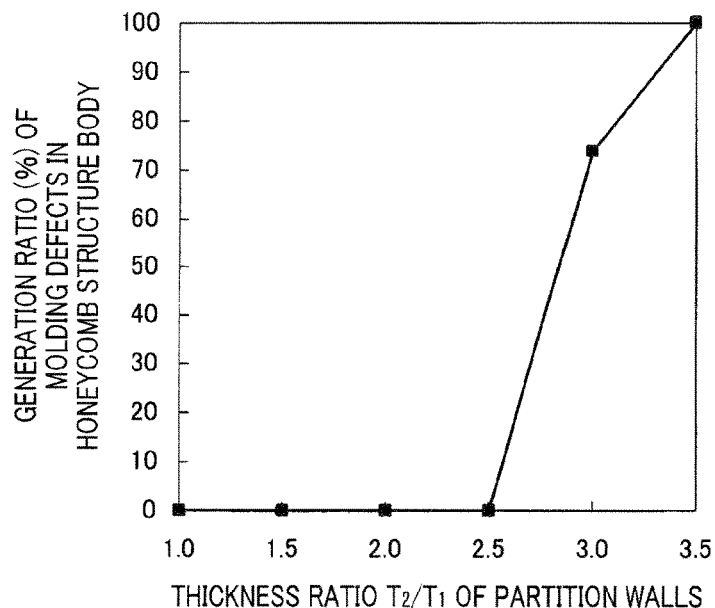
FIG. 19 is a view explaining a relationship between a thickness ratio $T_2/T_1$ of partition walls and a generation ratio of molding defect in the honeycomb structure body according to the fifth exemplary embodiment of the present invention.

FIG. 19 is a view explaining a relationship between the thickness ratio $T_2/T_1$ of the partition walls 11 and a generation ratio of molding defect in each sample.

The reason why a molding defect is detected on the basis of the condition of the partition walls 11 of the adjacent interior cells 221 is as follows:

When a thickness of the partition wall 115 extending to the boundary wall 14 is increased, raw material is easily fed to the slit grooves corresponding to the partition walls 115 (reinforced partition walls) during a molding step in the manufacturing of the honeycomb structure body. As a result, this introduces fluctuation of feeding raw material to slit grooves corresponding to the partition walls of the adjacent interior cells 221 formed near the partition walls 115 (reinforced partition walls), and such defects (broken partition walls and zigzag pattern) easily occur.

Further, it can be understood from the result shown in FIG. 18 that it is preferable for the honeycomb structure body to have the thickness ratio $T_2/T_1$ of the partition walls 11 of not less than 1.52. This structure makes it possible to obtain excellent mechanical strength which is equal to or more the mechanical strength of the comparative sample C1 even if the size of the boundary cell is increased to an optimum size which can prevent occurrence of catalyst clogging in the cells having a small size such as the boundary cells. Further, it can be recognized that the honeycomb structure body has the same tendency regarding the thickness ratio $T_2/T_1$ when having the connection cells, as explained in the fourth exemplary embodiment, and having the inclined partition walls as will be explained later in the sixth exemplary embodiment.

Still further, it can be understood from the result shown in FIG. 19 that it is preferable for the honeycomb structure body to have the thickness ratio $T_2/T_1$ of the partition walls 11 of not more than 2.5. This structure makes it possible to prevent generation of molding defect in the honeycomb structure body. Further, it can be recognized that the honeycomb structure body has the same tendency regarding the thickness ratio $T_2/T_1$ when having the connection cells, as explained in the fourth exemplary embodiment, and having the inclined partition walls as will be explained later in the sixth exemplary embodiment.

As previously described in detail, according to the fifth exemplary embodiment, it can be understood to increase the diameter D (mm) of the inscribed circle 210 of the boundary cell 21 by forming the relocated partition walls 112 (see FIG. 14 to FIG. 17). It is possible to produce the honeycomb structure body having an excellent mechanical strength and capable of preventing occurrence of catalyst clogging in cells having a small size such as the boundary cells 21 and reducing its pressure loss when the diameter D of the inscribe circle 210 of the boundary cell 21 is not less than 0.5 mm.

Sixth Exemplary Embodiment

A description will be given of the honeycomb structure body according to the sixth exemplary embodiment with reference to FIG. 20 to FIG. 27 and Table 6. The sixth exemplary embodiment produced the honeycomb structure body having inclined partition walls 113 instead of specific common use partition walls in a group which is in at least some of the common use partition walls. The inclined partition wall to be replaced with the specific common use partition wall is formed between the boundary cell 111 and the adjacent interior cell 221. The inclined partition wall 113 is inclined to the partition wall 11 which is usually formed.

Figure 20:
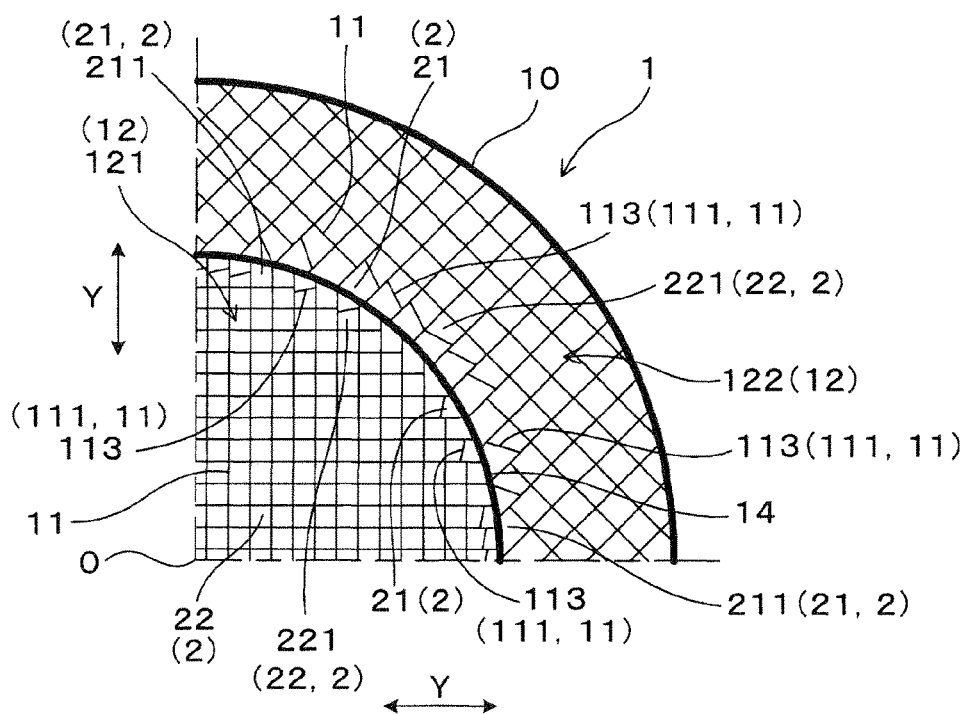
FIG. 20 is a view showing a partial cross section in a radial direction of a honeycomb structure body having inclined partition walls connected to partition walls according to a sixth exemplary embodiment of the present invention.

FIG. 20 is a view showing a partial cross section in a radial direction of the honeycomb structure body having the inclined partition walls 113 connected to the partition walls 11 according to the sixth exemplary embodiment. FIG. 21 is a view showing an enlarged partial cross section in a radial direction of the honeycomb structure body having the inclined partition walls 113 connected to the partition walls 11 according to the sixth exemplary embodiment shown in FIG. 20.

Figure 21:
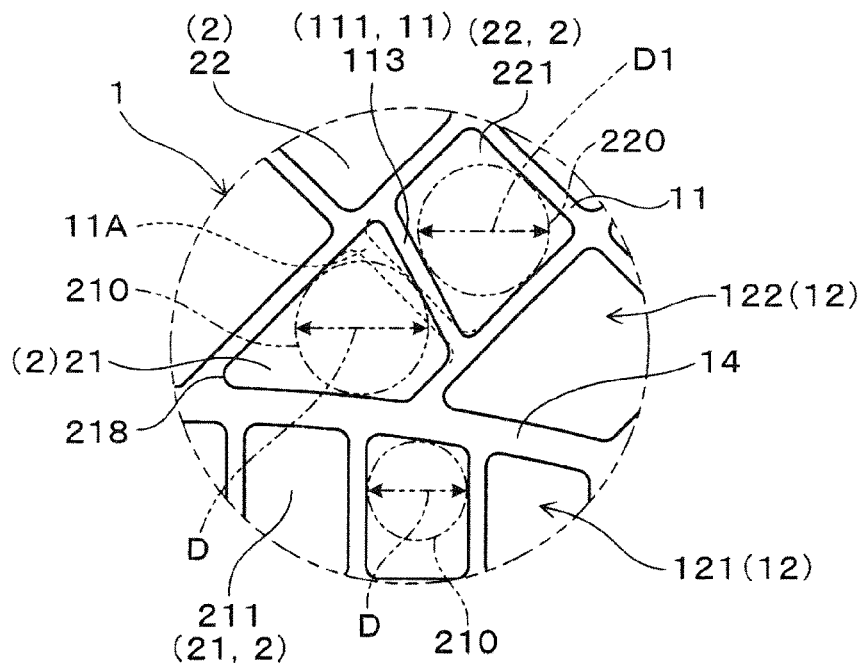
FIG. 21 is a view showing an enlarged partial cross section in a radial direction of the honeycomb structure body having the inclined partition walls connected to the partition walls according to the sixth exemplary embodiment shown in FIG. 20.

That is, as shown in FIG. 20 and FIG. 21, the honeycomb structure body according to the sixth exemplary embodiment has the inclined partition walls 113 instead of the specific common use partition walls in at least some of the common use partition walls. Each inclined partition wall 113 is inclined to the partition wall 11 by a predetermined angle. The formation of the inclined partition wall 113 makes it possible to increase a diameter D of an inscribed circle 210 of the boundary cell 21 surrounded by the inclined partition wall 113, the partition wall 11 and the boundary wall 14.

A description will now be given of the structure of the honeycomb structure body according to the sixth exemplary embodiment in detail.

In the honeycomb structure body according to the sixth exemplary embodiment shown in FIG. 20, most of the partition walls 11 are arranged in the predetermined lattice pattern in each of the cell density sections 121 and 122, like the partition walls 11 in the honeycomb structure body according to the fifth exemplary embodiment.

The honeycomb structure body according to the sixth exemplary embodiment further has the inclined partition wall 113 arranged in a pattern which is different from the predetermined lattice pattern to arrange the partition walls 11 which are usually used.

A virtual partition wall 11A will be considered. That is, as shown in FIG. 21, the virtual partition wall 11A is designated by the dotted lines. The virtual partition wall 11A is replaced with the inclined partition wall 113 which is inclined to the virtual partition wall 11A (as the usually-used partition wall 11) by a predetermined angle. However, if the boundary cell 21 is formed by using the virtual partition wall 11A, the size of the boundary cell 21 has a reduced size (or reduced area) when compared with the size of the boundary cell 21 having the inclined partition wall 113 which is replaced with the virtual partition wall 11A. For example, when using the virtual partition wall 11A, the boundary cell 21 has an inscribed circle having a diameter of less than 0.5 mm because the size of the boundary cell 21 is reduced by the formation of the virtual partition wall 11A. On the other hand, the use of the inclined partition wall 113 instead of the virtual partition wall 11A can increase the size (or area) of the boundary cell 21.

In the structure of the honeycomb structure body according to the sixth exemplary embodiment, the specific common use partition walls in at least some of the common use partition walls 111 are replaced with the inclined partition walls 113 in order to increase the size (i.e. area) of each of the boundary cells 21 (see FIG. 20 and FIG. 21). Specifically, in a case where the size of each of specific boundary cells 21 is reduced when the partition walls 11 (i.e. virtual partition walls 11A) are formed in the predetermined lattice pattern in each of the cell density sections 111 and 122 having the same cell density of the interior cells 22, the common use partition wall 111 forming the specific boundary cell 21 is replaced with the inclined partition walls 113 in order to increase the size of the specific boundary cell 21. The inclined partition wall 113 is inclined to the virtual partition wall 11A by the predetermined angle previously explained.

The formation of the inclined partition wall 113 instead of the specific common use partition walls makes it possible to increase the size of each of the boundary cells 21. Furthermore, it is possible to increase the size of the boundary cell 21 without reducing the size of the adjacent interior cell 221 more than necessary by adjusting an inclined angle of the inclined partition wall 113 to the virtual partition wall 11A.

Because the inclined partition wall 113 is inclined to the partition wall 11 by a relatively low angle, as shown in FIG. 20 and FIG. 21, the inclined partition wall 113 is in contact directly with the partition wall 11, not in contact with the boundary wall 14. In this structure shown in FIG. 21, the boundary cell 21 is formed to be connected directly to the boundary wall 14. On the other hand, the adjacent interior cell 211 is formed apart in location from or offset from the boundary wall 14 side when viewed from the inclined partition wall 113. That is, the adjacent interior cell 211 is arranged adjacent to the boundary cell 21 and formed at the opposite side of the boundary wall 14 side when viewed from the inclined partition wall 113 shown in FIG. 21.

Figure 22:
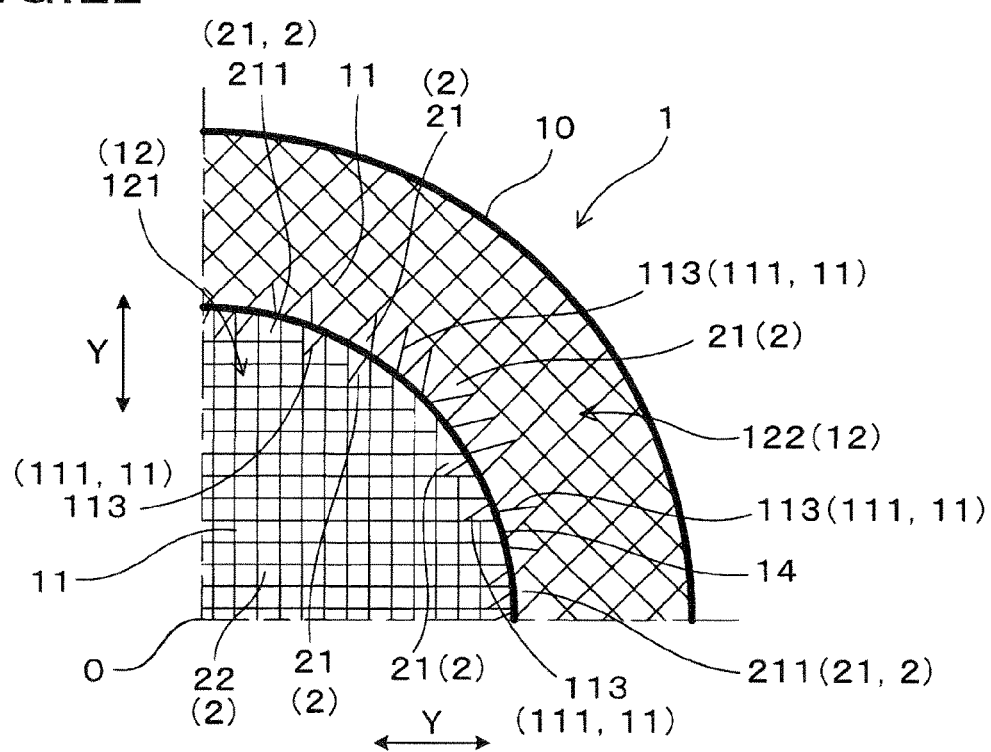
FIG. 22 is a view showing a partial cross section in a radial direction of the honeycomb structure body having another inclined partition wall connected directly to the boundary wall according to the sixth exemplary embodiment of the present invention.
Figure 23:
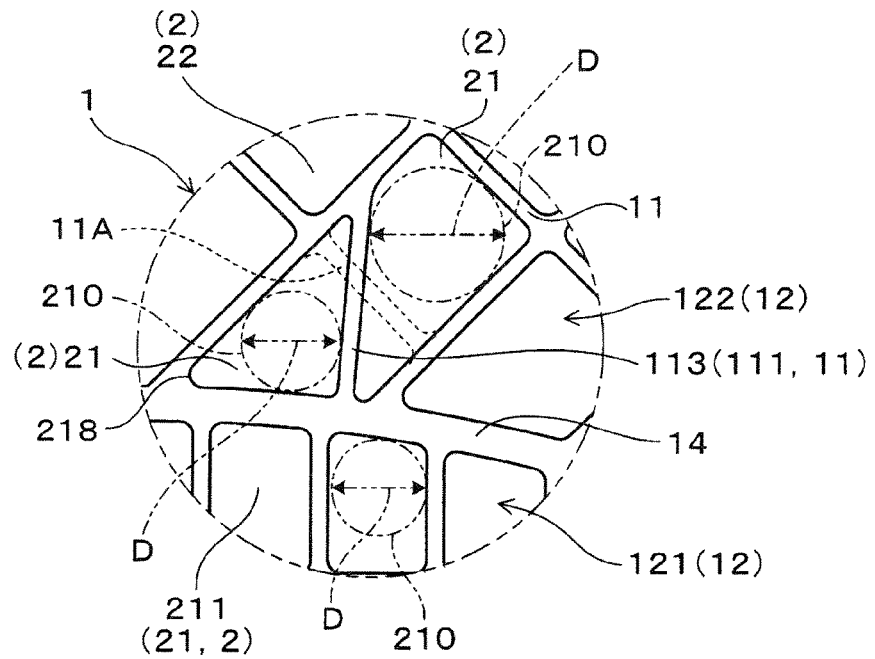
FIG. 23 is a view showing an enlarged partial cross section in a radial direction of the honeycomb structure body having another inclined partition wall connected directly to the boundary wall shown in FIG. 22.

On the other hand, when the inclined angle of the inclined partition wall 113 to the virtual partition wall 11A is increased, the inclined partition wall 113 finally becomes in contact directly with the boundary wall 14, as shown in FIG. 22 and FIG. 23.

FIG. 22 is a view showing a partial cross section in a radial direction of the honeycomb structure body having another inclined partition wall which is in contact directly with, i.e. connected to the boundary wall 14 according to the sixth exemplary embodiment. FIG. 23 is a view showing an enlarged partial cross section in a radial direction of the honeycomb structure body having the inclined partition wall connected to the boundary wall 14 shown in FIG. 22.

As shown in FIG. 22 and FIG. 23, the inclined partition wall 113 is in contact with the boundary wall 14. In this structure, the boundary cell 21 is divided into two sections (i.e. into two boundary cells 21) by the inclined partition wall 113.

As previously described in detail, the common use partition wall 111 is inclined to form the inclined partition wall 113 in each of specific boundary cells 21, where an inscribed circle 210 of which has a diameter D of less than the predetermined value (for example, 0.5 mm) when the virtual partition wall 11A is formed. This makes it possible for the boundary cell 21 to have its inscribed circle of not less than the predetermined value (0.5 mm). This structure makes it possible to prevent occurrence of catalyst clogging of the boundary cells 21.

Further, it is possible for the honeycomb structure body to have the adjacent interior cell 211, a diameter D1 of which becomes not less than 0.5 mm by forming the inclined partition wall 113. In this structure makes it possible to prevent occurrence of catalyst clogging in the adjacent interior cells 211 in addition to the boundary cells 21.

It is possible for all of the boundary cells 21 to have the inscribed circle, a diameter D of which becomes not less than the predetermined value by combining the formation of the connection cells 211 instead of using some of the boundary cells 21, like the first to fourth exemplary embodiments previously described, and the formation of the inclined partition wall 113 disclosed in the sixth exemplary embodiment.

For example, FIG. 20 to FIG. 23 show the honeycomb structure body showing a structure in which the connection cells 211 are formed instead of using the common use partition walls 111 in addition to the inclined partition walls 113 obtained by inclining the common use partition walls 111. It is also possible to increase the size of the boundary cell 21 which is larger than the predetermined size by forming the inclined partition walls 113 without using the connection cells 211. This structure can be obtained by adjusting the formation pattern of the partition walls 11 in each of the cell density sections 121 and 122.

Further, it is possible for the honeycomb structure body to have a combination of the inclined partition walls 113 used in the sixth exemplary embodiment and the relocated partition walls 112 used in the fifth exemplary embodiment (which are omitted from the drawings).

Other components of the honeycomb structure body according to the sixth exemplary embodiment are the same as those of the honeycomb structure body according to the first exemplary embodiment. Accordingly, the explanation of the same components is omitted here for brevity.

The sixth exemplary embodiment produced a test sample E21 and a test sample E22 having the inclined partition walls 113 to increase the diameter D of the inscribed circle of the boundary cell 21.

As shown in FIG. 20 and FIG. 21, the test sample E21 has the inclined partition walls 113 having a relatively small inclined angle. That is, the inclined partition wall 113 is in contact with the partition wall 11 without being in contact with the boundary wall 14.

On the other hand, shown in FIG. 22 and FIG. 23, the test sample E22 has the inclined partition walls 113 having a relatively large inclined angle. That is, the inclined partition wall 113 is in contact directly with the boundary wall 14.

Still further, the sixth exemplary embodiment produced honeycomb structure bodies as a test sample E23 and a test sample E24 having the reinforced partition walls 115 shown in FIG. 24 to FIG. 27, like the structure of the honeycomb structure body according to the fourth exemplary embodiment.

Figure 24:
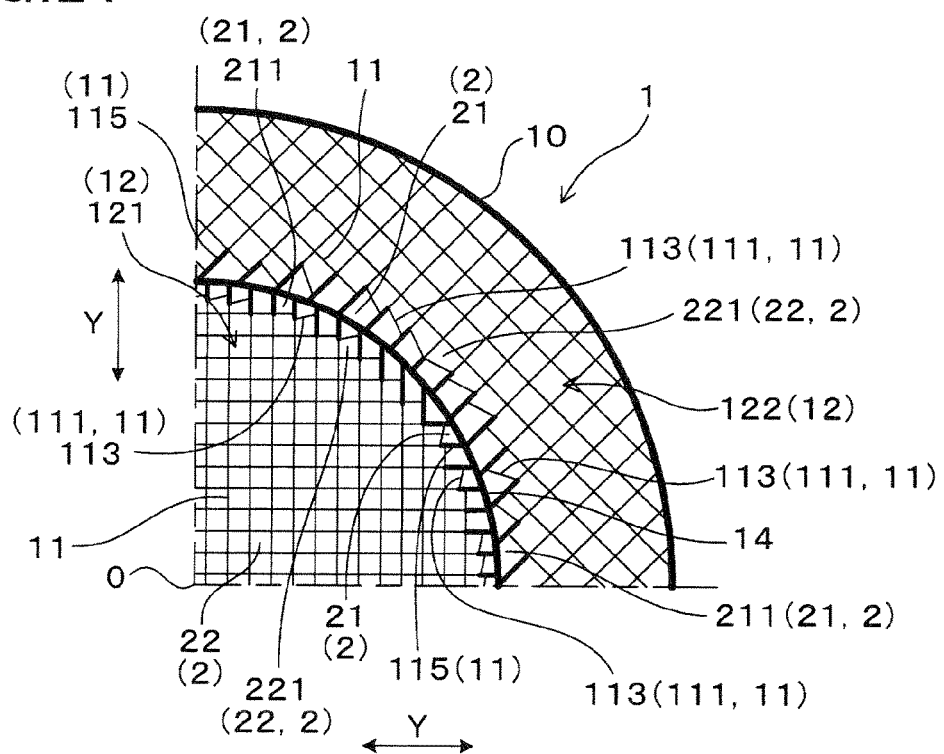
FIG. 24 is a view showing a partial cross section in a radial direction of a honeycomb structure body (test sample E23) having inclined partition walls connected to partition walls and reinforced partition walls having a large thickness extending to the boundary wall according to the sixth exemplary embodiment of the present invention.
Figure 25:
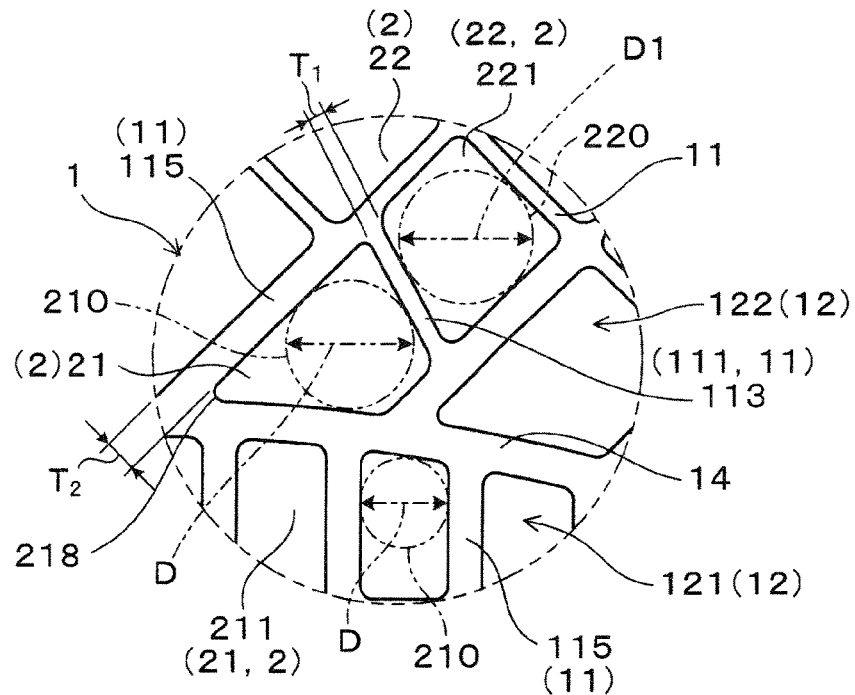
FIG. 25 is a view showing an enlarged partial cross section in a radial direction of a honeycomb structure body (test sample E23) having the inclined partition walls which are in contact with the boundary wall and the reinforced partition walls having a large thickness extending to the boundary wall shown in FIG. 24.

FIG. 24 is a view showing a partial cross section in a radial direction of a honeycomb structure body (test sample E23) having the inclined partition walls 113 connected to the partition walls 11 and the reinforced partition walls 115 having a large thickness extending to the boundary wall 14 according to the sixth exemplary embodiment. FIG. 25 is a view showing an enlarged partial cross section in a radial direction of a honeycomb structure body (test sample E24) having the inclined partition walls which are in contact with the boundary wall 14, like the structure of the test sample E22, and the reinforced partition walls 115 having a large thickness extending to the boundary wall 14 according to the sixth exemplary embodiment.

Figure 26:
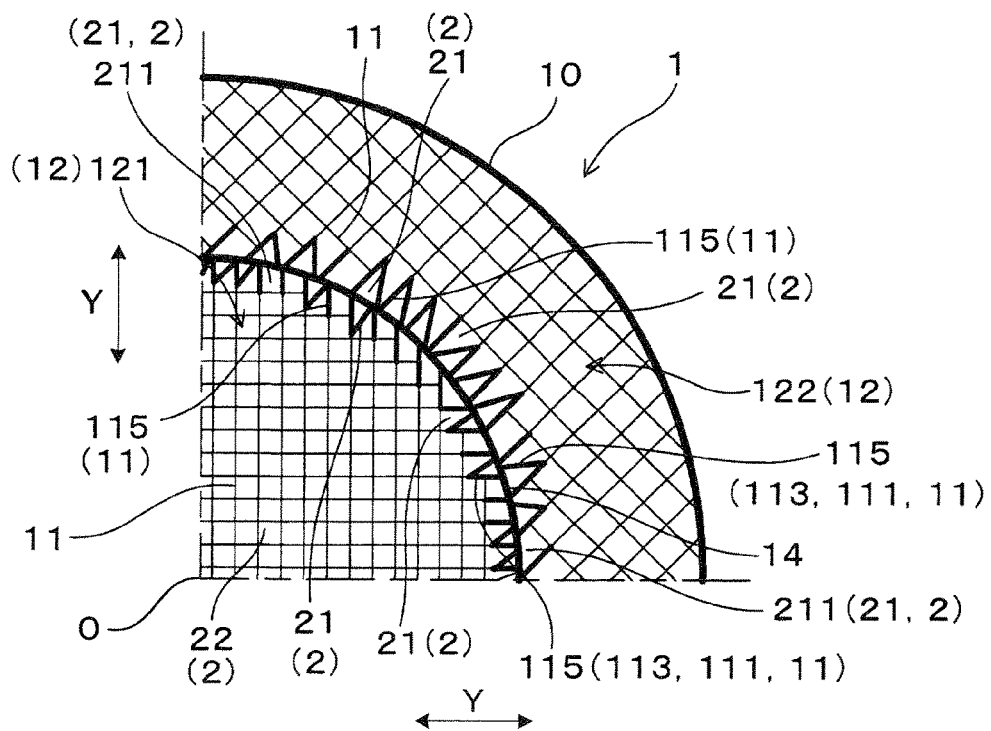
FIG. 26 is a view showing a partial cross section in a radial direction of the honeycomb structure body (test sample e24) having inclined partition walls having a large thickness, which are reinforced, connected directly to the boundary wall, and reinforced partition walls having a large thickness extending to the boundary wall according to the sixth exemplary embodiment of the present invention.
Figure 27:
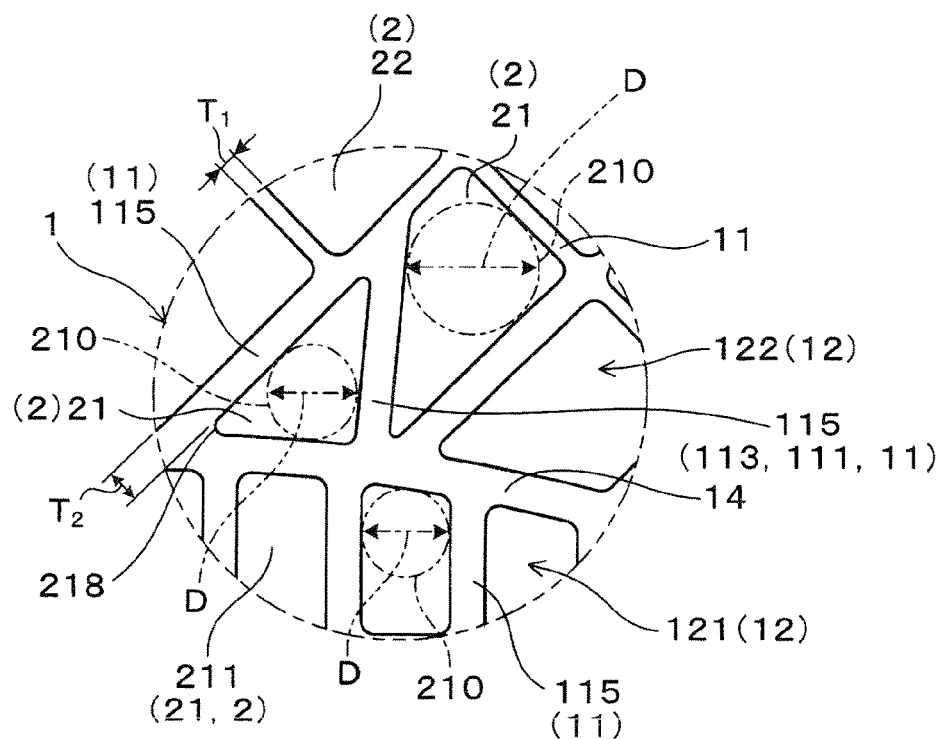
FIG. 27 is a view showing an enlarged partial cross section in a radial direction of the honeycomb structure body having the inclined partition walls having a large thickness connected directly to the boundary wall and the reinforced partition walls having a large thickness extending to the boundary wall shown in FIG. 26.

FIG. 26 is a view showing a partial cross section in a radial direction of the honeycomb structure body having the inclined partition walls 113 having a large thickness, which are reinforced, connected directly to the boundary wall 14 and the reinforced partition walls 115 having a large thickness extending to the boundary wall 14 according to the sixth exemplary embodiment. FIG. 27 is a view showing an enlarged partial cross section in a radial direction of the honeycomb structure body having the inclined partition walls 113 having a large thickness connected directly to the boundary wall 14 and the reinforced partition walls 113 having a large thickness extending to the boundary wall 14, shown in FIG. 26.

Further, the sixth exemplary embodiment produced honeycomb structure bodies as test samples E25 to E28 having the first cell density section and the second cell density section having a cell density which is different from a cell density of each of the first and second cell density sections of the test sample E21 and the test sample E22. The test samples E25 and E27 have the same structure as the test sample E21 except for the cell density of each of the first and second cell density sections. The test samples E26 and E28 have the same structure as the test sample E22 except for the cell density of each of the first and second cell density sections.

Table 6 shows the parameters and evaluation results of the test samples E17 to E20, and the comparative samples C14 to C16 as follows:

(a1) Cell density ($\times 10^4$ cells/m$^2$) of first cell density section;

(a2) Cell density ($\times 10^4$ cells/m$^2$) of second cell density section;

(a12) Presence of inclined partition walls (a13) Presence of connection node between inclined partition wall and boundary wall;

(a5) Minimum diameter D (mm) of inscribed circle of boundary cell;

(a6) Radius of Curvature (mm) of corner section of boundary cell adjacently and in contact with boundary wall;

(a10) Ratio $T_2/T_1$, where $T_1$ indicates thickness of partition wall 11 and $T_2$ indicates thickness of partition wall 115 extending to boundary wall 14;

(a8) Isostatic strength ratio;

(a7) Evaluation result in catalyst clogging in cell; and (a9) Pressure loss ratio.

It had been adjusted that in the test samples E21 to E28 having the inclined partition walls 113 and the boundary cells 21, the diameter D of the inscribed circle 210 of the boundary cell 21 was not less than 0.5 mm, and the inscribed circle 220 of the adjacent interior cell 221 had the diameter D1 of not less than 0.5 mm (which are omitted from table 6). Still further, like the first exemplary embodiment, the sixth exemplary embodiment evaluated each of the test samples E21 to E28 regarding the isostatic strength ratio, the catalyst clogging and the pressure loss ratio. Table 6 shows these evaluation results. Further, Table 6 shows the evaluation results and various parameter of the comparative samples C1 used in the first exemplary embodiment, the comparative samples C6 used in the second exemplary embodiment, and the comparative samples C10 used in the third exemplary embodiment.

TABLE 6

| Sample No. | C1 | E21 | E22 | E23 | E24 | C6 | E25 | E26 | C10 | E27 | E28 |
|---|---|---|---|---|---|---|---|---|---|---|---|
| Cell density ($\times 10^4$ cells/m$^2$) of First cell density section | 93 | 93 | 93 | 93 | 93 | 116 | 116 | 116 | 62 | 62 | 62 |
| Cell density ($\times 10^4$ cells/m$^2$) of Second cell density section | 62 | 62 | 62 | 62 | 62 | 93 | 93 | 93 | 47 | 47 | 47 |
| Inclined partition wall | N | P | P | P | P | N | P | P | N | P | P |
| Connection node between Inclined partition wall and Boundary wall | N | N | P | N | P | N | N | P | N | N | P |
| Minimum diameter (mm) of Inscribed circle of Boundary cell | 0.2 | 0.5 | 0.5 | 0.5 | 0.5 | 0.2 | 0.5 | 0.5 | 0.2 | 0.5 | 0.5 |
| Radius of Curvature (mm) of Corner section of Boundary cell adjacently in contact with Boundary wall | 0.05 | 0.05 | 0.05 | 0.05 | 0.05 | 0.05 | 0.05 | 0.05 | 0.05 | 0.05 | 0.05 |
| Ratio $T_2/T_1$ | 1.00 | 1.00 | 1.00 | 1.52 | 1.52 | 1.00 | 1.00 | 1.00 | 1.00 | 1.00 | 1.00 |
| Isostatic strength ratio | 1 | 0.80 | 0.79 | 0.99 | 1.02 | 1 | 0.83 | 0.83 | 1 | 0.71 | 0.69 |
| Evaluation result in Catalyst clogging | D | A | A | A | A | D | A | A | C | A | A |
| Pressure loss ratio | 1 | 0.94 | 0.94 | 0.94 | 0.94 | 1 | 0.95 | 0.95 | 1 | 0.92 | 0.92 |

P: Presence, N: None.

As can be understood from the results shown in Table 6, the structure of the honeycomb structure body as each of the test samples E21 to E28 (shown in FIG. 20 to FIG. 27), in which the inclined partition walls 113 are formed and each of the boundary cells 21 has its inscribed circle having a diameter of not less than 0.5 mm, can suppress reduction of the mechanical strength, occurrence of catalyst clogging in the boundary cells, and reduce its pressure loss.

In addition to the structure of the honeycomb structure body according to the sixth exemplary embodiment having the inclined partition walls 113, it is possible to further add the reinforced partition walls 115, like the structure of the honeycomb structure body according to the fourth exemplary embodiment having the connection cells 211 and the structure of the honeycomb structure body according to the fifth exemplary embodiment having the relocated partition walls 112. This structure makes it possible to increase the mechanical strength of the honeycomb structure body.

As previously explained in detail, according to the sixth exemplary embodiment, the formation of the inclined partition walls 113 makes it possible to increase or expand the diameter D of the inscribed circle 210 of the boundary cell 21. This structure makes it possible to provide the honeycomb structure body having a high mechanical strength and capable of preventing occurrence of catalyst clogging in cells having a small size such as the boundary cells 21, or generation of catalyst-clogged cells, and reducing its pressure loss.

Seventh Exemplary Embodiment

A description will be given of the honeycomb structure body according to the seventh exemplary embodiment with reference to FIG. 28. Similar to the honeycomb structure body according to each of the first to sixth exemplary embodiments previously described, it can be understood to prevent occurrence of catalyst clogging in the boundary cells 21, i.e., generation of catalyst-clogged cells by forming the connection cells 211, the relocated partition walls 112 or inclined partition walls 113 in order to increase a diameter D of an inscribed circle of each boundary cell 21.

The seventh exemplary embodiment evaluates a relationship between a diameter D of an inscribed circle of each boundary cell and a generation rate of catalyst clogging in boundary cells.

Figure 28:
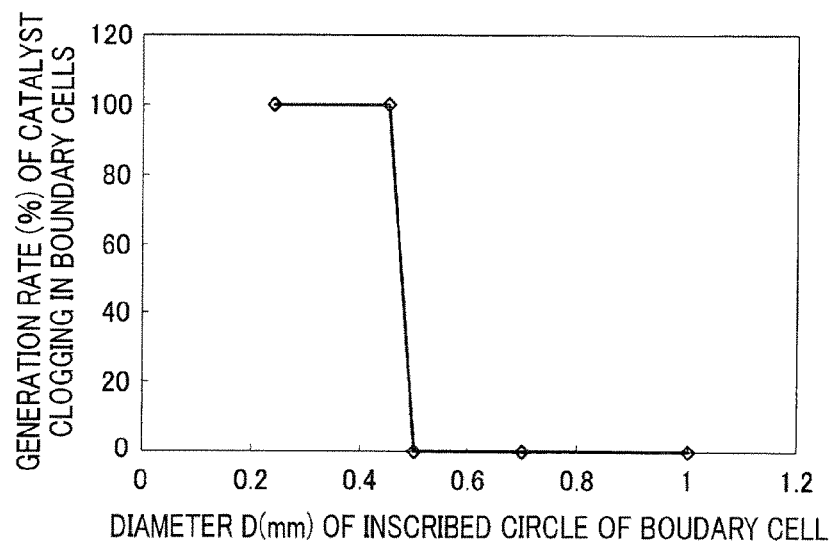
FIG. 28 is a view explaining the relationship between a diameter of an inscribed circle of each boundary cell and a generation rate of catalyst clogging in the boundary cells in honeycomb structure bodies having a different diameter according to a seventh exemplary embodiment of the present invention.

FIG. 28 is a view explaining the relationship between a diameter D of an inscribed circle of each boundary cell and a generation rate of catalyst clogging in the boundary cells in honeycomb structure bodies having a different diameter D.

Like the method of detecting occurrence of catalyst clogging in cells used in the first exemplary embodiment, the generation rate of catalyst clogging in boundary cells was obtained by counting the number of catalyst-clogged cells to the total number of boundary cells.

As can be understood from the results shown in FIG. 28, the catalyst clogging occurs in the boundary cell when the diameter D of its inscribed circle of the boundary cell becomes less than 0.5 mm. On the other hand, no catalyst clogging occurs in the boundary cell when the diameter D of an inscribed circle of the boundary cell is not less than 0.5 mm. That is, it is possible to prevent generation of catalyst clogging in the boundary cells when an inscribed circle of each boundary cell has a diameter of not less than 0.5 mm.

The honeycomb structure body having the connection cells 211, relocated partition walls 112 or the inclined partition walls 113 are the same relationship, as shown in FIG. 28, between the diameter D of the inscribed circle of each boundary cell and the generation rate of catalyst clogging in the boundary cells. Further, the adjacent interior cells, previously explained in the fifth exemplary embodiment and the sixth exemplary embodiment, have the same relationship, shown in FIG. 28, between the diameter D of the inscribed circle of each adjacent interior cell and the generation rate of catalyst clogging in the adjacent interior cells. That is, it is possible to prevent occurrence of catalyst clogging in adjacent interior cells when an inscribed circle of the adjacent interior cell has a diameter D1 of not less than 0.5 mm.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A honeycomb structure body comprising:
an outer peripheral wall having a cylindrical shape;
partition walls formed in the honeycomb structure body, the outer peripheral wall surrounding the partition walls arranged in a lattice shape; and
a plurality of cells, each of the cells being surrounded by the partition walls, wherein:
in a cross section in a radial direction of the honeycomb structure body, which is perpendicular to an axial direction of the honeycomb structure body, the cells are divided into a plurality of cell density sections from a central section to the outer peripheral wall, the cell density sections having a different cell density,
a boundary wall is formed between two cell density sections adjacent to each other,
each of the cell density sections comprises boundary cells and interior cells, the boundary cells are formed in contact with the boundary wall, and the interior cells are formed not in contact with the boundary wall and surrounded by the partition walls,
an inscribed circle of each of the boundary cells has a diameter of not less than 0.5 mm,
each of the partition walls extending to the boundary wall has a thickness which is larger than a thickness of each of the partition walls forming the interior cells, and
a thickness ratio of the thickness of the partition wall extending to the boundary wall to the thickness of the partition wall forming the interior cell is within a range of not less than 1.52 and not more than 2.5.

2. The honeycomb structure body according to claim 1, wherein each boundary cell in a certain number of boundary cells comprises a connection cell which is formed by connecting the cells together, which are adjacent to each other.

3. The honeycomb structure body according to claim 2, wherein the partition walls comprise common use partition walls,
the common use partition walls are arranged between the boundary cells and adjacent interior cells formed adjacent to the boundary cells, respectively, and
wherein an inscribed circle of at least one of the adjacent interior cells has a diameter of not less than 0.5 mm, in addition to the inscribed circle of each of the boundary cells having the diameter of not less than 0.5 mm.

4. The honeycomb structure body according to claim 2, wherein the partition walls comprise common use partition walls,
the common use partition walls are arranged between the boundary cells and adjacent interior cells formed adjacent to the boundary cells, respectively, and
wherein an inscribed circle of at least one of the adjacent interior cells has a diameter of not less than 0.5 mm in addition to the inscribed circle of each of the boundary cells having the diameter of not less than 0.5 mm.

5. The honeycomb structure body according to claim 2, wherein in a cross section in the radial direction which is perpendicular to the axial direction of the honeycomb structure body, a corner section of the boundary cells arranged adjacent to the boundary wall has a round shape, and a radius of curvature of the corner section is less than 0.05 mm.

6. The honeycomb structure body according to claim 2, wherein each of the partition walls extending to the boundary wall has a thickness which is larger than a thickness of each of the partition walls forming the interior cells.

7. The honeycomb structure body according to claim 1, wherein the partition walls comprise common use partition walls,
the common use partition walls are arranged between the boundary cells and adjacent interior cells formed adjacent to the boundary cells, respectively, and
wherein an inscribed circle of at least one of the adjacent interior cells has a diameter of not less than 0.5 mm, in addition to the inscribed circle of each of the boundary cells having the diameter of not less than 0.5 mm.

8. The honeycomb structure body according to claim 7, wherein the partition walls comprise common use partition walls,
the common use partition walls are arranged between the boundary cells and adjacent interior cells formed adjacent to the boundary cells, respectively, and
wherein an inscribed circle of at least one of the adjacent interior cells has a diameter of not less than 0.5 mm in addition to the inscribed circle of each of the boundary cells having the diameter of not less than 0.5 mm.

9. The honeycomb structure body according to claim 7, wherein in a cross section in the radial direction which is perpendicular to the axial direction of the honeycomb structure body, a corner section of the boundary cells arranged adjacent to the boundary wall has a round shape, and a radius of curvature of the corner section is less than 0.05 mm.

10. The honeycomb structure body according to claim 7, wherein each of the partition walls extending to the boundary wall has a thickness which is larger than a thickness of each of the partition walls forming the interior cells.

11. The honeycomb structure body according to claim 1, wherein the partition walls comprise common use partition walls,
the common use partition walls are arranged between the boundary cells and adjacent interior cells formed adjacent to the boundary cells, respectively, and
wherein an inscribed circle of at least one of the adjacent interior cells has a diameter of not less than 0.5 mm in addition to the inscribed circle of each of the boundary cells having the diameter of not less than 0.5 mm.

12. The honeycomb structure body according to claim 11, wherein each of the inclined partition walls is connected directly to the boundary wall.

13. The honeycomb structure body according to claim 1, wherein in a cross section in the radial direction which is perpendicular to the axial direction of the honeycomb structure body, a corner section of the boundary cells arranged adjacent to the boundary wall has a round shape, and a radius of curvature of the corner section is less than 0.05 mm.

* * * * *